US008904495B2

(12) United States Patent
Baghdasaryan et al.

(10) Patent No.: US 8,904,495 B2
(45) Date of Patent: Dec. 2, 2014

(54) SECURE TRANSACTION SYSTEMS AND METHODS

(75) Inventors: Davit Baghdasaryan, Fremont, CA (US); Ramesh Kesanupalli, San Jose, CA (US); Frank Schwab, Phoenix, AZ (US); Philip Yiu Kwong Chan, Fremont, CA (US); Larry Hattery, Beaverton, OR (US)

(73) Assignee: Synaptics Incorporated, San Jose, CA (US)

( * ) Notice: Subject to any disclaimer, the term of this patent is extended or adjusted under 35 U.S.C. 154(b) by 360 days.

(21) Appl. No.: 12/751,954

(22) Filed: Mar. 31, 2010

(65) Prior Publication Data

US 2011/0083173 A1    Apr. 7, 2011

Related U.S. Application Data

(60) Provisional application No. 61/249,218, filed on Oct. 6, 2009, provisional application No. 61/292,820, filed on Jan. 6, 2010.

(51) Int. Cl.
 G06F 7/04      (2006.01)
 G06Q 20/00   (2012.01)
 G06Q 20/10   (2012.01)
 G06Q 20/40   (2012.01)

(52) U.S. Cl.
 CPC ............... G06Q 20/10 (2013.01); G06Q 20/40 (2013.01); G06Q 20/401 (2013.01); G06Q 20/40145 (2013.01)
 USPC ................................................. 726/5; 705/75

(58) Field of Classification Search
 USPC ........ 726/2–5, 21, 26–30; 713/150, 168, 169, 713/182, 185, 186, 189, 193; 705/35, 44, 705/50, 64, 67, 75, 76; 235/375, 379; 340/5.1, 5.8–5.85
 See application file for complete search history.

(56) References Cited

U.S. PATENT DOCUMENTS 5,280,527 A    1/1994   Gullman et al.
5,326,104 A    7/1994   Pease et al.
(Continued)

FOREIGN PATENT DOCUMENTS

EP    2343677 A1    7/2011
EP    2343679 A1    7/2011
(Continued)

OTHER PUBLICATIONS

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.
(Continued)

Primary Examiner — Gilberto Barron, Jr.
Assistant Examiner — Abdulhakim Nobahar
(74) Attorney, Agent, or Firm — Shartsis Friese LLP; Cecily Anne O'Regan; William C. Cray

(57) ABSTRACT

A user transaction request is received at a client device. A web browser plug-in communicates the user transaction request to a server that determines whether the user transaction request is a secure transaction. Transaction data is received from the server via the web browser plug-in. If the received transaction data indicates a secure transaction, the user is prompted to provide biometric data, which is received from the user. The web browser plug-in then communicates a transaction confirmation to the server.

9 Claims, 17 Drawing Sheets

(56) References Cited

U.S. PATENT DOCUMENTS

| | | |
|---|---|---|
| 5,326,194 A | 7/1994 | Pinto et al. |
| 5,428,684 A | 6/1995 | Akiyama et al. |
| 5,884,289 A | 3/1999 | Anderson et al. |
| 5,930,804 A | 7/1999 | Yu et al. |
| 6,091,835 A * | 7/2000 | Smithies et al. ............. 382/115 |
| 6,134,340 A | 10/2000 | Hsu et al. |
| 6,173,400 B1 | 1/2001 | Perlman et al. |
| 6,182,076 B1 | 1/2001 | Yu et al. |
| 6,182,221 B1 | 1/2001 | Hsu et al. |
| 6,332,193 B1 | 12/2001 | Glass et al. |
| 6,460,163 B1 | 10/2002 | Bowman et al. |
| 6,819,219 B1 | 11/2004 | Bolle et al. |
| 6,963,974 B1 | 11/2005 | Skinner et al. |
| 7,004,389 B1 | 2/2006 | Robinson et al. |
| 7,014,107 B2 | 3/2006 | Singer et al. |
| 7,136,841 B2 * | 11/2006 | Cook ............................. 705/75 |
| 7,174,323 B1 * | 2/2007 | Schultz et al. .................. 705/75 |
| 7,188,362 B2 | 3/2007 | Brandys |
| 7,200,576 B2 | 4/2007 | Steeves et al. |
| 7,233,942 B2 | 6/2007 | Nye |
| 7,269,256 B2 | 9/2007 | Rosen |
| 7,283,534 B1 | 10/2007 | Kelly et al. |
| 7,356,705 B2 | 4/2008 | Ting |
| 7,398,390 B2 | 7/2008 | Hyser |
| 7,502,761 B2 | 3/2009 | Siegal et al. |
| 7,505,941 B2 | 3/2009 | Bishop et al. |
| 7,530,099 B2 | 5/2009 | Flurry et al. |
| 7,543,737 B2 | 6/2009 | Bensimon et al. |
| 7,565,330 B2 * | 7/2009 | Steeves et al. .................. 705/75 |
| 7,589,832 B2 | 9/2009 | Den Boef et al. |
| 7,623,659 B2 | 11/2009 | Huang et al. |
| 7,664,709 B2 | 2/2010 | Chatani et al. |
| 7,681,103 B2 | 3/2010 | Devadas et al. |
| 7,685,629 B1 | 3/2010 | White et al. |
| 7,693,279 B2 | 4/2010 | Chen et al. |
| 7,698,230 B1 * | 4/2010 | Brown et al. .................. 705/75 |
| 7,752,450 B1 | 7/2010 | Palmer et al. |
| 7,797,434 B2 | 9/2010 | Blakley et al. |
| 7,831,840 B1 | 11/2010 | Love et al. |
| 7,844,579 B2 | 11/2010 | Peterson et al. |
| 8,032,932 B2 | 10/2011 | Speyer et al. |
| 8,046,589 B2 | 10/2011 | Akkermans et al. |
| 8,078,885 B2 | 12/2011 | Jobmann |
| 8,112,787 B2 | 2/2012 | Buer |
| 8,132,242 B1 | 3/2012 | Wu |
| 8,290,150 B2 | 10/2012 | Erhart et al. |
| 8,327,142 B2 | 12/2012 | Lund et al. |
| 8,421,595 B2 | 4/2013 | Cassone |
| 8,799,666 B2 | 8/2014 | Kesanupalli et al. |
| 2001/0029527 A1 | 10/2001 | Goshen |
| 2002/0026478 A1 | 2/2002 | Rodgers et al. |
| 2002/0029194 A1 * | 3/2002 | Lewis et al. ...................... 705/39 |
| 2002/0073046 A1 | 6/2002 | David |
| 2002/0112162 A1 | 8/2002 | Cocotis et al. |
| 2002/0140542 A1 | 10/2002 | Prokoski et al. |
| 2002/0156726 A1 | 10/2002 | Kleckner et al. |
| 2002/0174348 A1 | 11/2002 | Ting |
| 2003/0064805 A1 | 4/2003 | Wells |
| 2003/0074559 A1 * | 4/2003 | Riggs ............................ 713/168 |
| 2003/0123714 A1 | 7/2003 | O'Gorman et al. |
| 2003/0135740 A1 | 7/2003 | Talmor et al. |
| 2004/0010697 A1 | 1/2004 | White |
| 2004/0030741 A1 * | 2/2004 | Wolton et al. ................. 709/202 |
| 2004/0034784 A1 | 2/2004 | Fedronic et al. |
| 2004/0230536 A1 * | 11/2004 | Fung et al. ....................... 705/64 |
| 2004/0260657 A1 | 12/2004 | Cockerham |
| 2005/0109835 A1 | 5/2005 | Jacoby et al. |
| 2005/0177750 A1 | 8/2005 | Gasparini et al. |
| 2005/0198377 A1 * | 9/2005 | Ferguson et al. .............. 709/238 |
| 2006/0005022 A1 | 1/2006 | Wakamori et al. |
| 2006/0006224 A1 | 1/2006 | Modi |
| 2006/0078176 A1 | 4/2006 | Abiko et al. |
| 2006/0159313 A1 | 7/2006 | Hicks et al. |
| 2006/0212487 A1 | 9/2006 | Kennis et al. |
| 2006/0239514 A1 | 10/2006 | Watanabe et al. |
| 2006/0259873 A1 | 11/2006 | Mister |
| 2006/0287963 A1 | 12/2006 | Steeves et al. |
| 2007/0016943 A1 | 1/2007 | M'Ralhi |
| 2007/0021198 A1 | 1/2007 | Muir et al. |
| 2007/0031009 A1 | 2/2007 | Mwale |
| 2007/0036400 A1 | 2/2007 | Watanabe et al. |
| 2007/0038867 A1 | 2/2007 | Verbauwhede et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0106895 A1 | 5/2007 | Huang et al. |
| 2007/0174206 A1 | 7/2007 | Colella |
| 2007/0180263 A1 | 8/2007 | Delgrosso et al. |
| 2007/0198435 A1 | 8/2007 | Siegal et al. |
| 2007/0226516 A1 | 9/2007 | Kubota |
| 2007/0237366 A1 | 10/2007 | Maletsky |
| 2007/0245152 A1 | 10/2007 | Pizano et al. |
| 2007/0245154 A1 | 10/2007 | Akkermans et al. |
| 2007/0266342 A1 | 11/2007 | Chang et al. |
| 2008/0072061 A1 | 3/2008 | Cannon et al. |
| 2008/0072063 A1 | 3/2008 | Takahashi et al. |
| 2008/0077796 A1 | 3/2008 | Lund et al. |
| 2008/0127311 A1 | 5/2008 | Yasaki et al. |
| 2008/0147547 A1 * | 6/2008 | Drummond et al. ............ 705/43 |
| 2008/0155269 A1 | 6/2008 | Yoshikawa |
| 2008/0170695 A1 | 7/2008 | Adler et al. |
| 2008/0178008 A1 | 7/2008 | Takahashi et al. |
| 2008/0183728 A1 | 7/2008 | Cornelius et al. |
| 2008/0185429 A1 | 8/2008 | Saville |
| 2008/0189411 A1 | 8/2008 | Motoyama et al. |
| 2008/0222049 A1 | 9/2008 | Loomis et al. |
| 2008/0244277 A1 | 10/2008 | Orsini et al. |
| 2008/0289020 A1 | 11/2008 | Cameron et al. |
| 2008/0320600 A1 | 12/2008 | Pandiscia et al. |
| 2009/0013191 A1 | 1/2009 | Popowski |
| 2009/0024499 A1 * | 1/2009 | Ribble ............................ 705/35 |
| 2009/0070860 A1 | 3/2009 | Hirata et al. |
| 2009/0089867 A1 | 4/2009 | Weatherford et al. |
| 2009/0132813 A1 | 5/2009 | Schibuk |
| 2009/0164796 A1 | 6/2009 | Peirce |
| 2009/0164798 A1 | 6/2009 | Gupta |
| 2009/0210942 A1 | 8/2009 | Abel |
| 2009/0217366 A1 | 8/2009 | Gao et al. |
| 2009/0228714 A1 | 9/2009 | Fiske et al. |
| 2009/0313687 A1 | 12/2009 | Popp et al. |
| 2009/0319435 A1 | 12/2009 | Little, Jr. et al. |
| 2009/0319797 A1 | 12/2009 | Toernqvist |
| 2010/0049659 A1 | 2/2010 | Cassone |
| 2010/0083000 A1 | 4/2010 | Kesanupalli |
| 2010/0088754 A1 | 4/2010 | Ghislanzoni |
| 2010/0146275 A1 | 6/2010 | Slick et al. |
| 2010/0191634 A1 | 7/2010 | Macy et al. |
| 2011/0060913 A1 | 3/2011 | Hird et al. |
| 2011/0082791 A1 | 4/2011 | Baghdasaryan et al. |
| 2011/0082800 A1 | 4/2011 | Baghdasaryan et al. |
| 2011/0082801 A1 | 4/2011 | Baghdasaryan et al. |
| 2011/0082802 A1 | 4/2011 | Baghdasaryan et al. |
| 2011/0083016 A1 | 4/2011 | Kesanupalli et al. |
| 2011/0083018 A1 | 4/2011 | Kesanupalli et al. |
| 2011/0083170 A1 | 4/2011 | Kesanupalli et al. |
| 2011/0138450 A1 | 6/2011 | Kesanupalli et al. |
| 2012/0012652 A1 * | 1/2012 | Couper et al. ................. 235/379 |

FOREIGN PATENT DOCUMENTS

| | | |
|---|---|---|
| EP | 2348472 A1 | 7/2011 |
| EP | 2391053 A1 | 11/2011 |
| JP | 2006/350767 | 12/2006 |
| WO | WO 98/57247 A1 | 12/1998 |
| WO | WO 03/007538 A1 | 1/2003 |
| WO | WO 2005/018137 A1 | 2/2005 |
| WO | WO 2010/034036 A1 | 3/2010 |

OTHER PUBLICATIONS

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet:

(56) References Cited

OTHER PUBLICATIONS

URL:http://alexandria.tue.nl/extral/afstversl/wsk-i/hgt2008.pdf [retrieved on Mar. 29, 2011] *pp. 127-134, paragraph 6.2*.
ITD, "Anti-Money Laundering", ITD, Jan. 22, 2009.

Edward Suh and Ariniva Devadas: Physical uncloneable functions for device authentication and secret key generation, ACM, Proceedings of the 44th annual Design Automation Conference, 2007, New York.

* cited by examiner

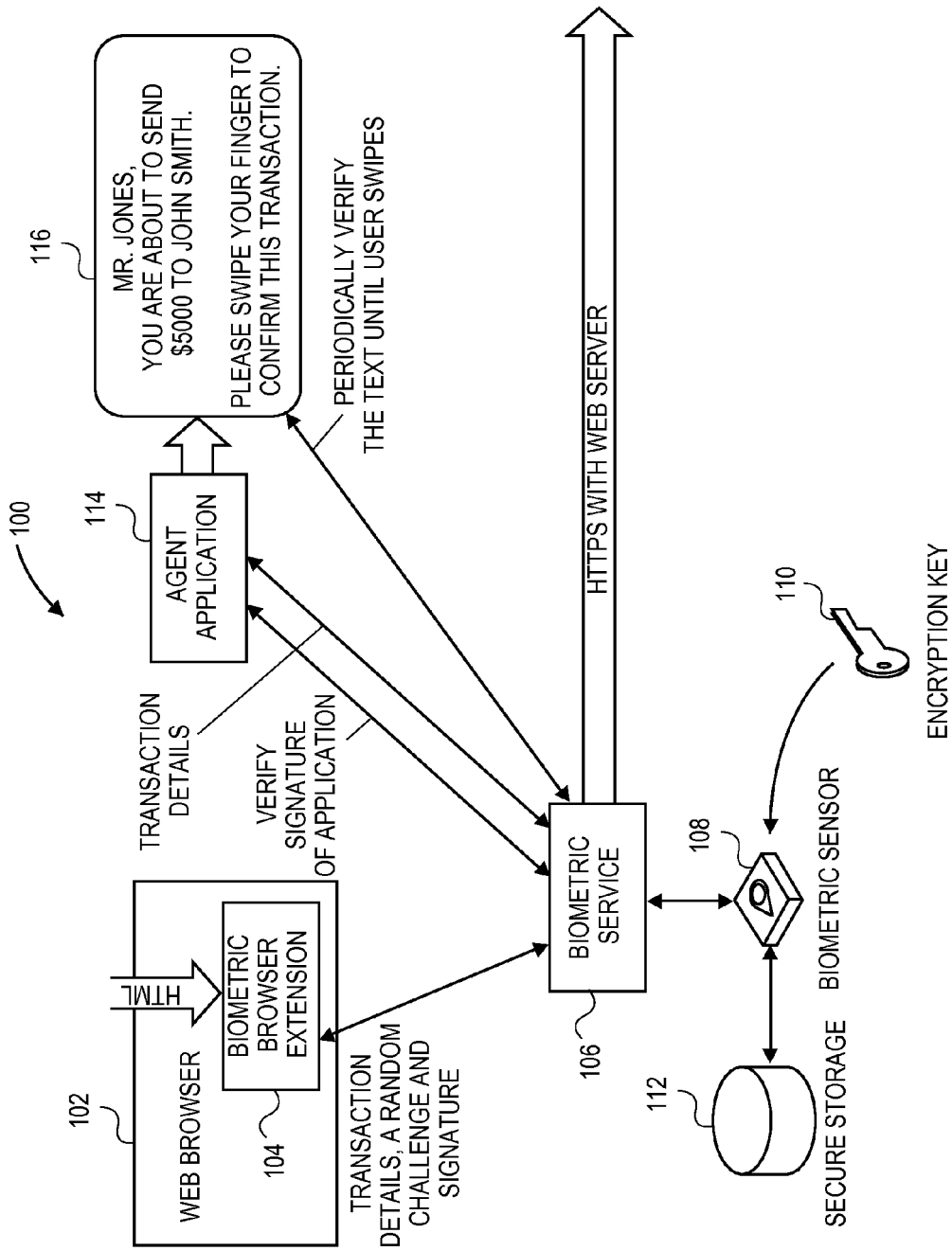

SECURE TRANSACTION SYSTEMS AND METHODS

RELATED APPLICATIONS

This application claims the benefit of U.S. Provisional Application No. 61/249,218, filed Oct. 6, 2009, the disclosure of which is incorporated by reference herein. This application also claims the benefit of U.S. Provisional Application No. 61/292,820, filed Jan. 6, 2010. This application also references the following U.S. Non-Provisional Applications: U.S. Non-Provisional application Ser. No. 12/731,027, filed Mar. 24, 2010, U.S. Non-Provisional application Ser. No. 12/731,037, filed Mar. 24, 2010, U.S. Non-Provisional application Ser. No. 12/731,050, filed Mar. 24, 2010, U.S. Non-Provisional application Ser. No. 12/751,952, filed Mar. 31, 2010, U.S. Non-Provisional application Ser. No. 12/751,964, filed Mar. 31, 2010, U.S. Non-Provisional application Ser. No. 12/751,983, filed Mar. 31, 2010, U.S. Non-Provisional application Ser. No. 12/751,969, filed Mar. 31, 2010, and U.S. Non-Provisional application Ser. No. 12/793,499, filed Jun. 3, 2010. All of these co-pending applications are incorporated by reference herein.

BACKGROUND

Typical user authentication systems and procedures use passwords to authenticate the identity of the user. In many instances, Web sites are authenticated using SSL (Secure Sockets Layer) or other protocols. SSL is a protocol for securely transmitting information via the Internet. When using SSL, a Web site is authenticated via its certificate. The user seeking access to the Web site is then authenticated by username and password.

Although passwords are commonly used to authenticate users, passwords are subject to various attacks, such as phishing attacks, social engineering attacks, dictionary attacks and the like. Typically, longer passwords with combinations of letters and numbers provide a higher level of security. However, these longer passwords are more difficult for users to remember. Additionally, passwords provide a single factor of authentication by requiring the user to provide something they know. This factor does not provide any physical authentication of the user's identity. Thus, any person can access the user's Web-based accounts and information if they gain knowledge of the user's password and username. Additionally, anyone with knowledge of a user's password can initiate transactions (e.g., purchase transactions and fund transfers) without the user's permission.

Another potential threat that occurs when using passwords is commonly referred to as "Man in the Browser" attacks. These types of attacks involve malicious software applications (malware) running in the internet browser while the user is logging on to a web site or performing a financial transaction.

One of the implementations of this attack is to get access to user's password when the user provides their password to the internet browser. After this point malware can conduct any type of malicious action with the user's account.

Another example of a "Man in the Browser" attack is to modify the transaction information on the fly and dupe the user by encouraging them to confirm a transaction which they didn't intend to confirm. The malware residing in the internet browser has full access to all graphical user interface parts of the browser (window, text, etc.) and may change them whenever necessary. Therefore, it's important to not trust the browser user interface when conducting important financial operations or when logging in to a web account.

Therefore, it is desirable to provide a user authentication method and system that offers a more secure authentication of the user, and more secure transactions, than commonly used password-based systems and methods.

BRIEF DESCRIPTION OF THE DRAWINGS

FIG. 1 depicts an example system capable of implementing secure transactions as discussed herein.

Throughout the description, similar reference numbers may be used to identify similar elements.

DETAILED DESCRIPTION

Figure 2A:
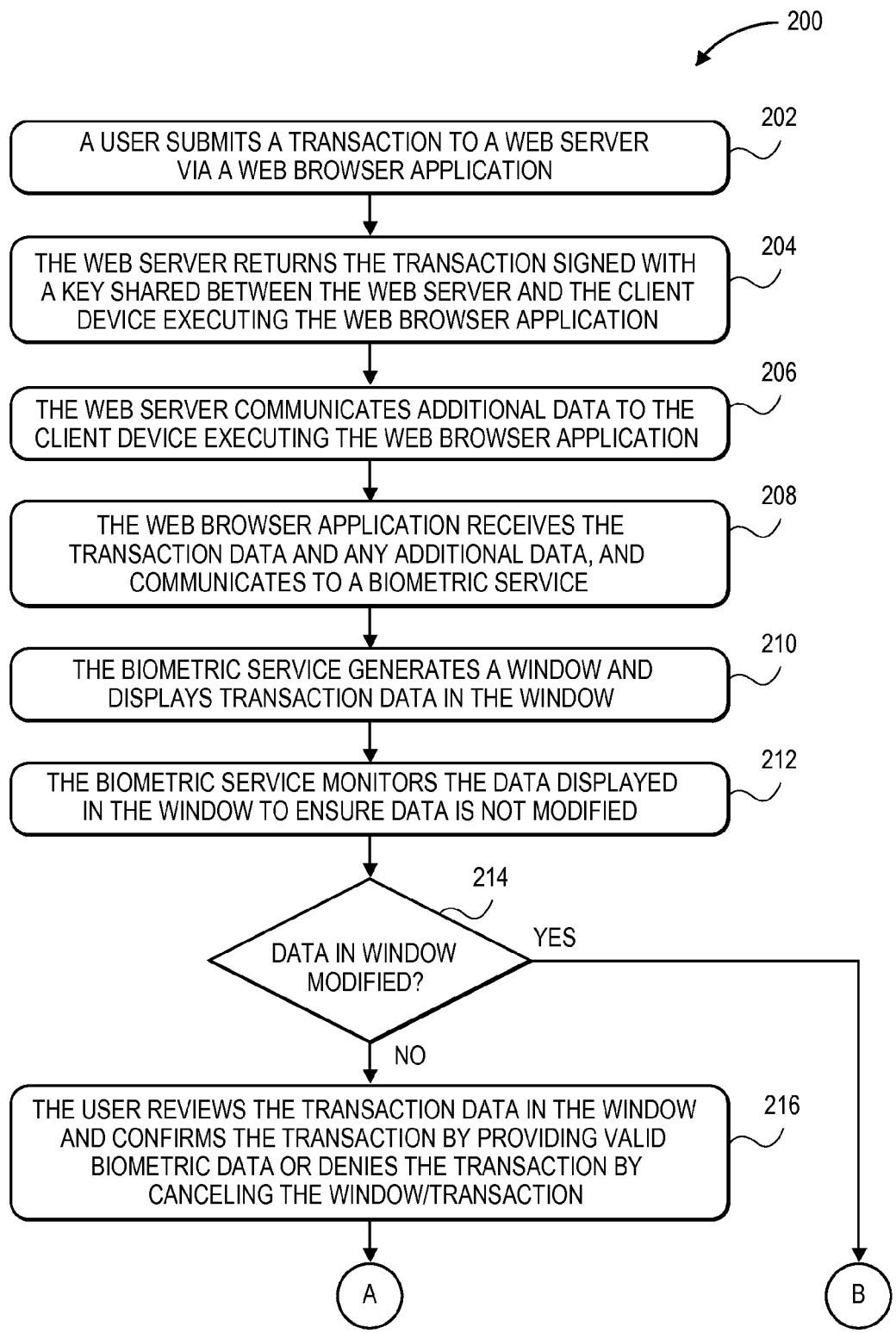
FIGS. 2A and 2B represent a flow diagram depicting an embodiment of a procedure for implementing a secure transaction.

The systems and methods described herein relate to biometric authentication of users. "Biometrics", "biometric information" and "biometric data" refers to measurable biological characteristics of a user, such as fingerprint characteristics, facial characteristics, eye characteristics, voice characteristics (also referred to as a "voiceprint") and the like. As discussed herein, biometric information provides an additional level of security when used in systems and procedures related to authentication of a user and the implementation of secure transactions.

Particular examples discussed herein use fingerprint biometric information to authenticate one or more users. In other embodiments, any type of biometric information may be used instead of fingerprint information. Additionally, a particular embodiment may utilize multiple types of biometric information (e.g., fingerprints and voiceprints) to authenticate a user. Certain described embodiments refer to "swipe" style fingerprint sensors. However, alternate embodiments may include any type of fingerprint sensor, such as a "placement" sensor.

In particular embodiments, the biometric sensor is physically attached (or manufactured into) a client device, such as a computer, cellular phone, and so forth. In other embodiments, the biometric sensor is a portable device that is temporarily coupled to the client device (e.g., a pluggable USB device) for enrollment, authentication and/or secure transaction procedures.

As used herein, a "web application", a "web-based application", and a "web-enabled application" refers to a software application or software routine that is capable of communicating with one or more web servers or similar devices via the Internet or other data communication network. Additionally, a "plug-in", "browser plug-in" or a "browser extension" refers to an application or extension that provides a variety of different features and functions. Particular examples of "plug-ins" and "browser plug-ins" discussed herein provide features and functions related to user authentication while, for example, accessing web sites, implementing secure transactions, and the like. In particular embodiments, the browser plug-in is installed as part of the manufacturing process of devices equipped with associated biometric devices. In other embodiments, the browser plug-in is downloaded (e.g., via the Internet) at any time after the device is manufactured. In specific implementations, the browser plug-in is operable with any biometric device that supports the Windows Biometric Framework or other supported architectures or systems.

As discussed above, typical passwords do not provide any physical authentication of the user's identity. Thus, any person can access a user's Web-based accounts and related information if they gain knowledge of the user's password and username. Additionally, anyone with the user's password and username can initiate a transaction (such as a financial transaction) without the user's permission. Using biometric information in the user authentication and/or transaction process provides an increased level of security by authenticating physical characteristics of the user. Thus, an imposter with the correct password but lacking the required physical characteristics will not be authenticated by the system and not permitted to initiate a transaction needing user permission.

The systems and methods described herein perform biometric user authentication in several steps. A specific discussion of these user authentication steps is provided below.

FIG. 1 depicts an example system 100 capable of implementing secure transactions as discussed herein. A web browser application 102 executing on a user's computing device communicates with various web servers via the Internet. Web browser application 102 includes a browser extension 104 (or browser plug-in) that communicates with a biometric service 106. In a particular embodiment, biometric service 106 is a secure application executing in a background mode on the user's computing device. Biometric service 106 provides a communication interface to a biometric sensor 108, such as a fingerprint sensor. Embodiments of biometric sensor 108 may include a unique encryption key 110 and may store various information, such as user names, encrypted secret keys, and the like in a secure storage device 112.

Browser extension 104 is capable of communicating transaction details, random challenges, signature information, and other data to biometric service 106. Biometric service 106 verifies the digital signature of an agent application 114 prior to communicating with the agent application. Biometric service 106 may communicate transaction details and related information to agent application 114. During a secure transaction, biometric service 106 also verifies the text presented in a transaction window 116 to the user until the user confirms the transaction by interacting with biometric sensor 108 (e.g., by presenting the user's fingerprint to a fingerprint sensor). Agent application 114 is responsible for launching transaction window 116 and displaying transaction information in the transaction window. Biometric service 106 communicates with one or more web servers as part of the user authentication procedure and during implementation of the secure transaction. Additional details regarding the enrollment and biometric authentication of a user are discussed below.

Figure 2B:
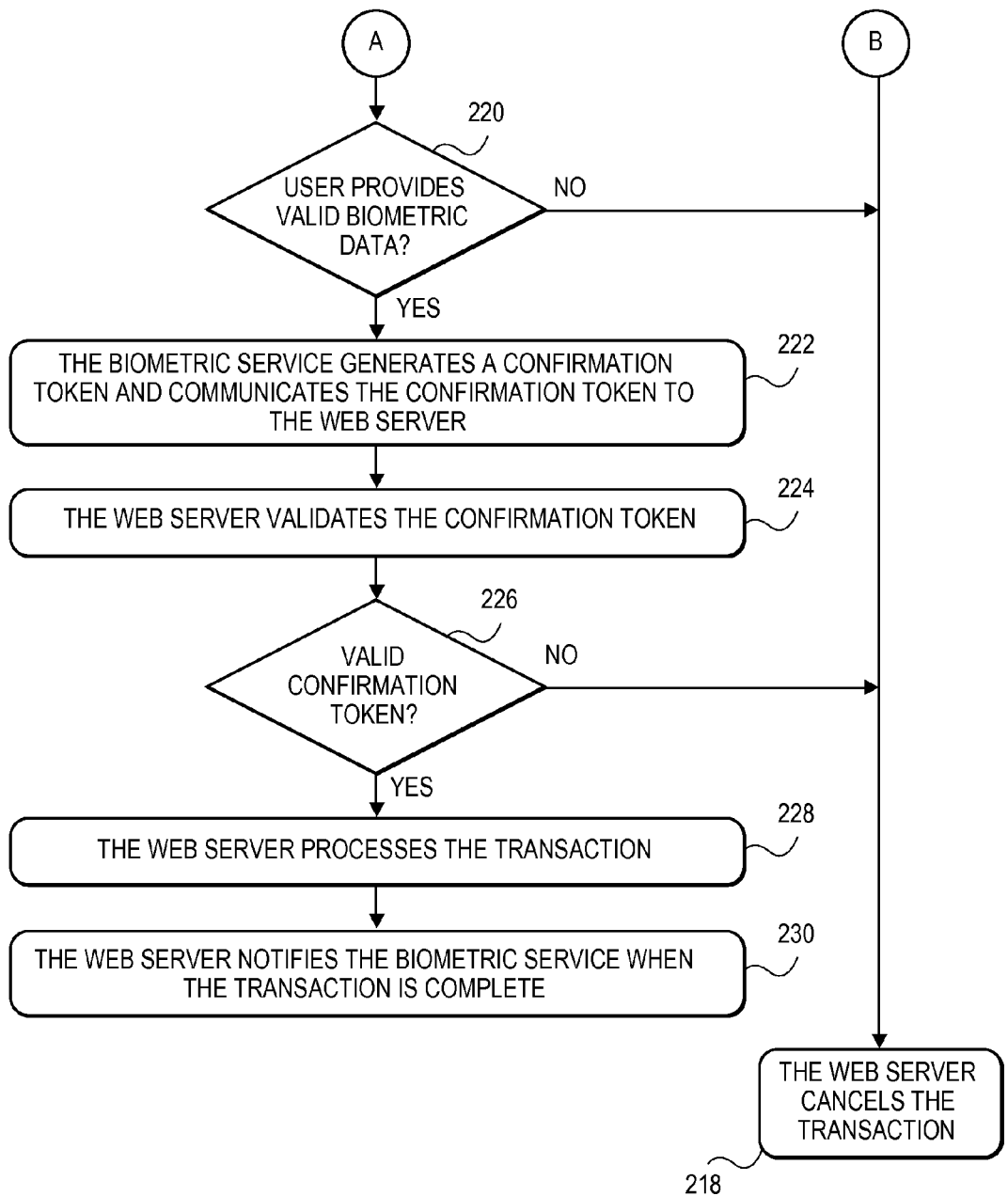

FIGS. 2A and 2B represent a flow diagram depicting an embodiment of a procedure 200 for implementing a secure transaction. A user submits a transaction to a web server via a web browser application (block 202). This transaction may include a purchase transaction, a funds transfer transaction, or any other transaction in which the user desires a particular level of security. The web server returns the transaction signed with a key that is shared between the client device (the computing system executing the web browser application) and the web server (block 204). The web server may also communicate additional data to the client device executing the web browser application (block 206). This additional data may include transaction details, time and other information. For example, additional data may include a cryptographic nonce.

The web browser application receives the transaction data and any additional data, and communicates the received data to a biometric service (block 208), such as biometric service 106 shown in FIG. 1. The biometric service then generates a window and displays transaction data in the window (block 210). This window is for the benefit of the user to view and confirm the transaction details. The biometric service then monitors the transaction data presented in the window to ensure that the presented data is not modified (block 212), e.g., by a malicious application or a malicious user. If the biometric service detects that any of the data in the window is modified, the biometric service instructs the web server to cancel the transaction (block 218). The biometric service may verify the integrity of the data in the window at regular (e.g., periodic) time intervals or at random time intervals.

If the data in the window is not modified, the user is then given the opportunity to review the transaction data presented in the window and either 1) confirm the transaction by providing valid biometric data; or 2) deny the transaction by canceling the window or canceling the transaction (block 216). If the user does not provide valid biometric data (or the user closes the window/cancels the transaction), the biometric service instructs the web server to cancel the transaction (block 218). If the user provides valid biometric data, the biometric service generates a confirmation token and communicates the confirmation token to the web server (block 222). The web server then validates the confirmation token (block 224). If the confirmation token is determined by the web server to be invalid, the web server cancels the transaction (block 218). However, if the confirmation is determined by the web server to be valid, the web server processes the transaction (block 228) and notifies the biometric service when the transaction is complete (block 230).

Figure 3:
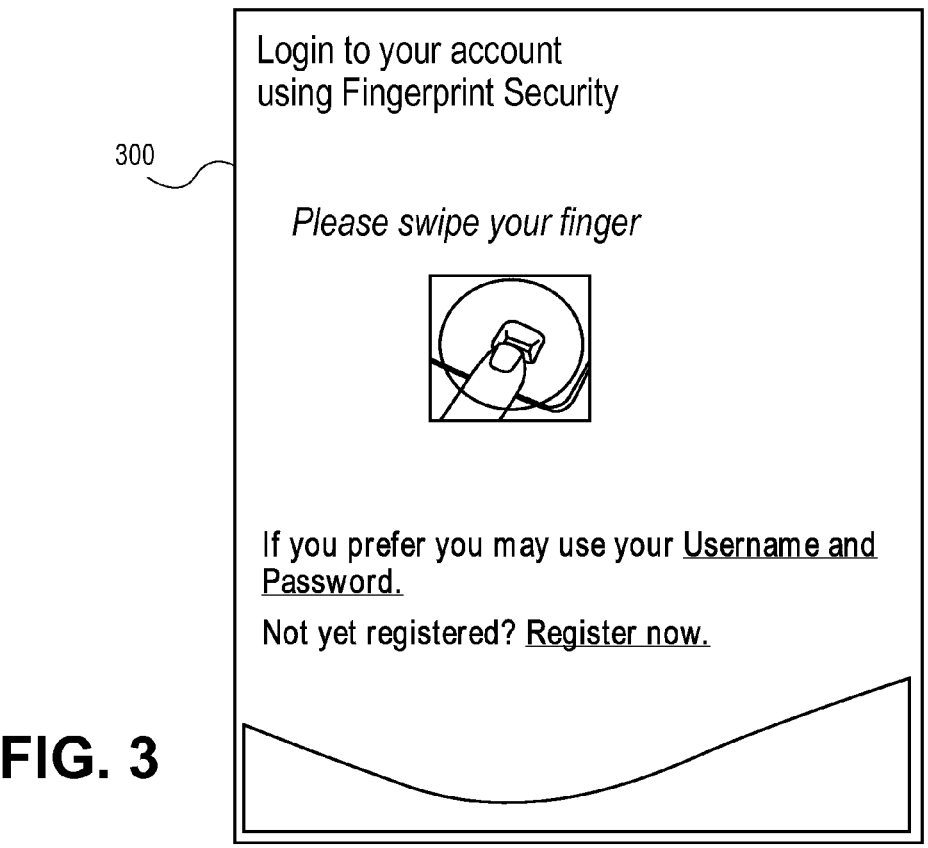
FIGS. 3-6 depict example user interface displays for implementing secure transactions.

FIGS. 3-6 depict example user interface displays for implementing secure transactions. FIG. 3 shows an example user interface display 300 that gives the user an opportunity to login to the user's account. In this example, the user logs into the account by swiping their finger across a fingerprint sensor or activating another biometric device.

Figure 4:
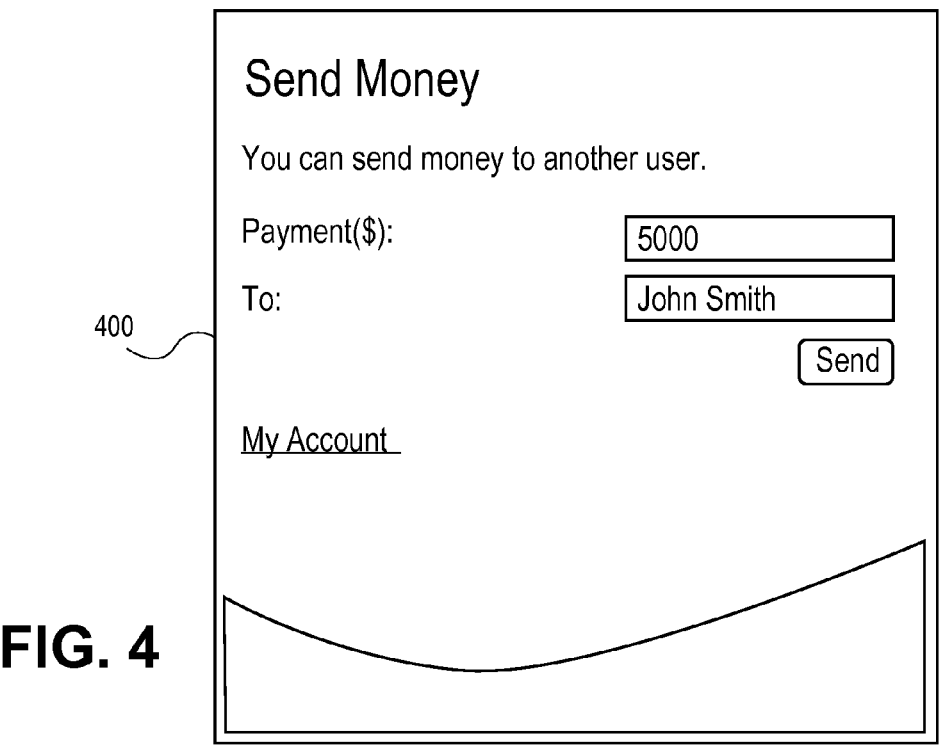

FIG. 4 shows an example user interface display 400 that allows the user to send funds to another user or to make a payment to a merchant or other person or entity. As shown in FIG. 4, the user can enter the amount of the payment or funds transfer as well as the name of the recipient of the funds. In alternate embodiments, the user may also identify additional information such as a scheduled time for the transaction or a comment/note related to the transaction.

Figure 5:
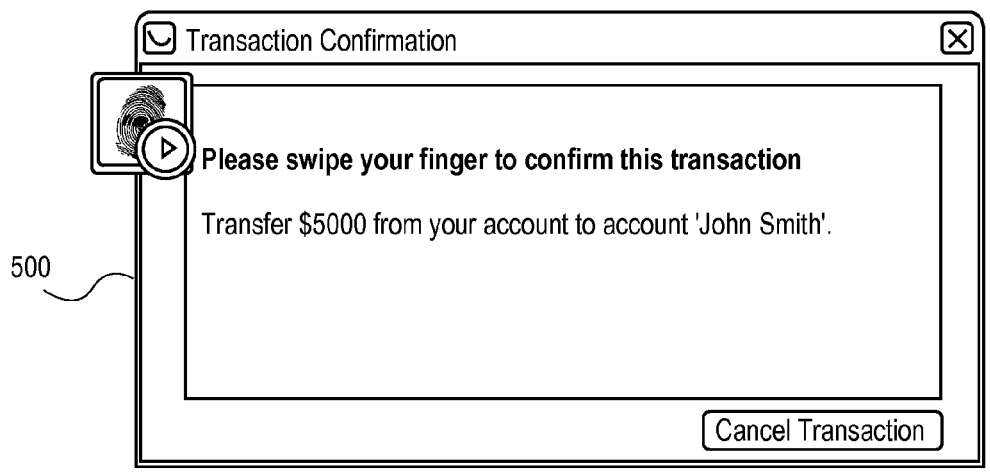
Figure 6:
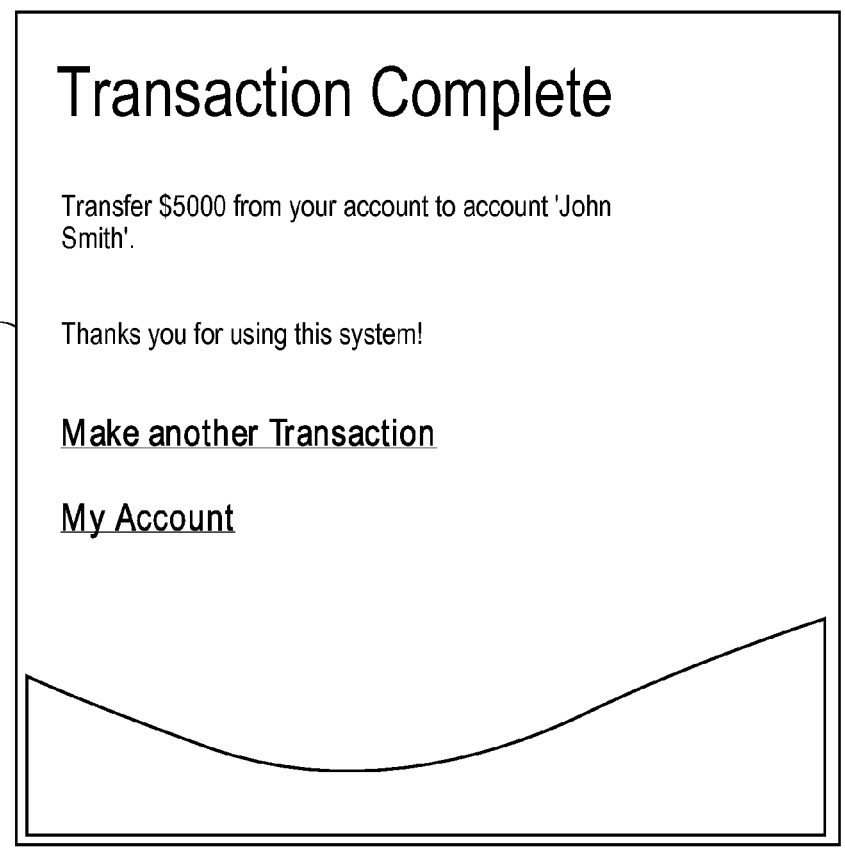

FIG. 5 shows an example user interface display 500 that allows a user to confirm a transaction by swiping their finger across a fingerprint sensor (or using another type of biometric device). The interface shown in FIG. 5 displays the transaction details, such as the amount of the funds transfer and the recipient of the funds. If the user chooses not to confirm the transaction, they can close the window shown in FIG. 5 or activate the "Cancel Transaction" button included in the display. To confirm the transaction, the user simply swipes their finger across the fingerprint sensor in their computing device. If the user swipes their fingerprint and the user's fingerprint information is verified, the web server processes the transaction. Upon completion of the transaction, the web server notifies the user that the transaction is complete by displaying a user interface window (such as example user interface 600 display shown in FIG. 6) indicating completion of the transaction. User interface 600 shown in FIG. 6 also displays the details of the completed transaction to the user.

Figure 7A:
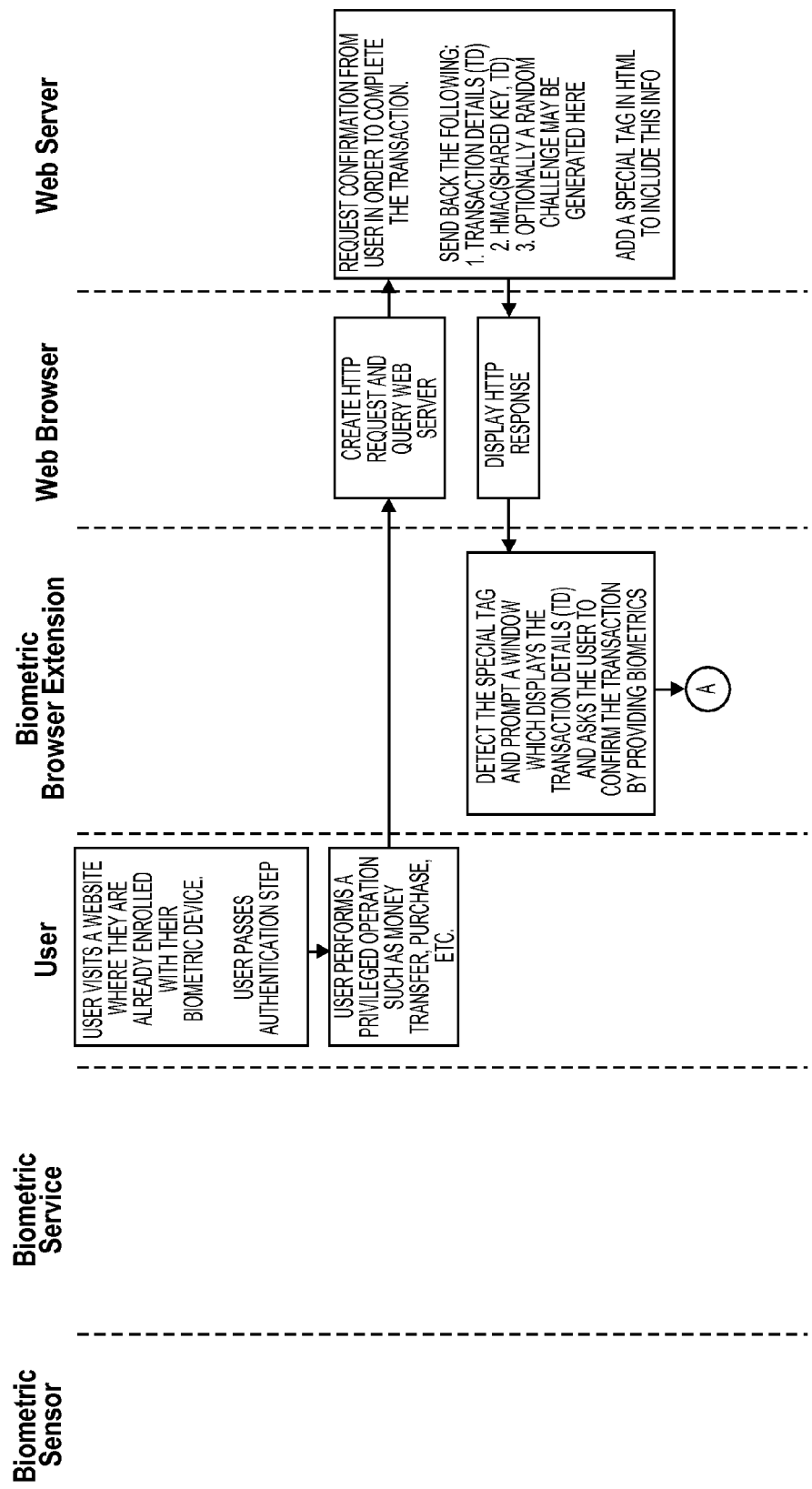
FIGS. 7A and 7B depict another example of a procedure for implementing a secure transaction.
Figure 7B:
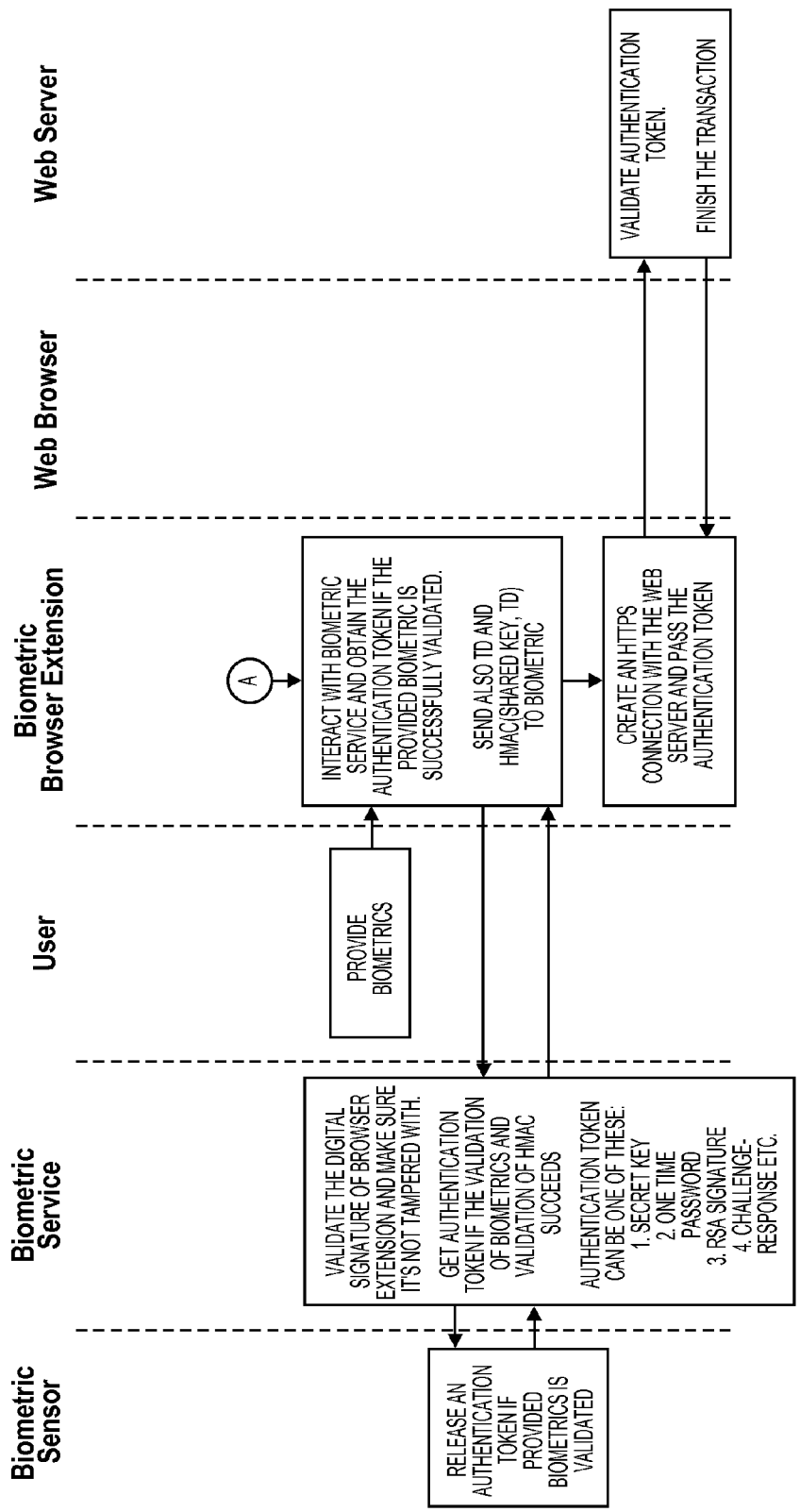

FIGS. 7A and 7B depict another example of a procedure for implementing a secure transaction. The example shown in FIGS. 7A and 7B includes various tasks, actions and functions performed by different systems, procedures or components, such as the biometric sensor, the biometric service, the user, the biometric browser extension, the internet browser application, and the web server. A user visits a web site where they previously enrolled their biometric information associated with a biometric device (e.g., a fingerprint sensor). If the user is authenticated, they can initiate a privileged operation, such as a secure transaction. This privileged operation may include transferring funds, purchasing a product or service, and the like.

The web browser application creates an HTTP request associated with the secure transaction and communicates the request to an appropriate web server. The web server requests information from the user to complete the requested secure transaction. The web server then returns various information, such as transaction details, a shared key, and a random challenge. This information returned by the web server is identified by a specific HTML tag inserted into the HTML code by the web server. Upon receiving this information from the web server, the web browser displays an appropriate response. The biometric browser extension detects the HTML tag inserted by the web server and requests the generation of a display window to display the transaction details and ask the user to confirm the transaction details by providing biometric authorization. The biometric browser extension interacts with the biometric service to obtain an authentication token if the user provides valid biometric information (e.g., a valid fingerprint is scanned by a fingerprint sensor).

The biometric service validates the digital signature of the biometric browser extension to be certain the biometric browser extension has not been modified or experienced any tampering. If the user provides valid biometric authorization and the biometric browser extension has not suffered any tampering, the biometric service creates an HTTPS connection with the appropriate web server and communicates the authentication token to the web server. The web server then validates the authentication token and completes the transaction.

In a particular embodiment, an agent application generates the display window to the user that provides transaction details and requests that the user confirm the transaction details by providing biometric authorization. This agent application is monitored by the biometric service to detect any modification of (or tampering with) the information displayed in the displayed window.

When a user begins using a device that has an associated biometric sensor, the user enrolls with the biometric user authentication system by binding their user credentials with the user's biometric template (a "fingerprint template" in specific implementations). The biometric template contains information related to the user's biometric characteristics (also referred to as "biometric information") obtained from a biometric sensor that scans or reads the user's biometric characteristics, such as a fingerprint. A user identification process identifies a particular user among multiple enrolled users (e.g., multiple users enrolled with a particular device, system or biometric sensor). A user verification process verifies that the user who provided their biometric information is who they claim to be by comparing the user's biometric information with the biometric template obtained during enrollment of the user. The enrollment, identification and verification of users are discussed in greater detail herein.

During an example enrollment process that uses a fingerprint sensor as the biometric sensor, a user swipes their finger across the fingerprint sensor several times to create a fingerprint template. The fingerprint template contains qualitative fingerprint information that allows the user's fingerprint to be distinguished from fingerprints associated with other users. In alternate embodiments, a placement fingerprint sensor (also referred to as a static fingerprint sensor) is used such that a user places their finger on the fingerprint sensor rather than "swiping" their finger across the fingerprint sensor. After creating a fingerprint template, the user provides user credentials, such as a password, cryptographic key, random seed, and the like. The systems and procedures described herein bind the user's fingerprint template with the user credentials. The fingerprint template and user credentials are then stored in a secure storage device. In one embodiment the secure storage device is contained within the fingerprint sensor hardware. In other embodiments, the secure storage device is contained in a device that utilizes the fingerprint sensor.

During an example user identification process (also referred to as a user verification process), a user swipes their finger across a fingerprint sensor. The process then determines whether the user's fingerprint information matches a fingerprint template associated with the fingerprint sensor. If the user's fingerprint information matches a fingerprint template, the user's credentials are released to the user and/or a service or process requesting the user verification. Thus, the user credentials are not released from the secure storage device until a matching fingerprint template is confirmed. In particular embodiments, the user credentials released as a result of a match with a fingerprint template are not necessarily the same credentials provided by the user during the enrollment process. For example, the user credentials released after finding a matching fingerprint template may include an OTP (One Time Password) token, RSA signature and the like. The enrollment process can be initiated by a Web server, a Web browser plug-in, and the like.

The described systems and methods communicate user credentials to a specific address, location, or other recipient identifier. Thus, even if an imposter can gain access to the user credentials, the system will send those user credentials to a predetermined address or location, thereby preventing the imposter from attempting to have the user credentials sent to an alternate address or location. The address or location information is stored within the user credentials and is established as part of the enrollment process.

Particular embodiments of the systems and methods discussed herein use strong cryptographic algorithms implemented in hardware and/or software. Example cryptographic algorithms include AES (Advanced Encryption Standard) 256, SHA (Secure Hash Algorithm) 256 and RSA 2048. Example biometric sensors are compatible with various standards, such as OATH-OCRA (OATH Challenge/Response Algorithms), TOPT (Time-based One-time Password Algorithm), HOPT (HMAC-Based OTP Algorithm), PKCS (Public Key Cryptography Standards) #11, RSA SecureID® (RSA Security) based OTP, and the like.

In a particular implementation, each biometric sensor has a unique identifier (ID) that is used to strengthen the level of security provided by the system or process. This unique ID provides an additional authentication factor representing "something you have". Since each biometric sensor has a unique ID, each user's biometric template and user credentials can be uniquely associated with a specific biometric sensor.

Specific implementations include a biometric sensor as part of a multi-component or multi-element authentication system. Particular embodiments may include one or more authentication factors, such as: 1) something you are; 2) something you have; and 3) something you know.

The systems and methods described herein are useful in performing Web site authentication. In example embodiments, a Web site that supports the authentication procedures discussed herein includes an HTML (Hyper Text Markup Language) tag that identifies a Web browser plug-in (also referred to as a "biometric plug-in") that is installed on the user's computing device. This HTML tag indicates to the browser that the Web site supports biometric authentication. Other example embodiments include an extension of an existing Web browser plug-in. Further implementations may utilize a browser helper object, ActiveX control, Browser Extension, or other approaches. In particular implementations, the Web browser plug-in obtains the biometric sensor's unique ID and communicates that unique ID (or a hash of the unique ID) to a web server via HTTP or HTTPS.

When a user accesses the Web site, the Web browser plug-in is activated and detects that a biometric sensor is installed in the user's computing device. The Web site suggests that the user enroll with their biometric sensor to provide a more secure user authentication. If the user accepts, theWeb site generates a secret key and passes the secret key to the user's computing device via a secure connection between the Web site and the user's computing device. The Web browser plug-in then activates the enrollment process to enroll the user. This enrollment process includes binding the Web site to the specific user. The web site then generates a secret key and passes the secret key to the user's computing device via a secure connection between the Web site and the user's computing device. In a particular implementation, the "enrollment" process includes enrolling the user's fingerprint and generating a secure key.

If the user also wants to bind their computing device with Web site authentication, the Web browser plug-in sends the biometric sensor's ID to the Web site server or other device/system. Multiple embodiments store information in various formats and on various devices or components within a system. Example embodiments may utilize a hash of the shared secret, a hash of the biometric sensor ID, and the like. At this point, the user can select different factors for authentication. In a particular embodiment, the Web site may require stronger authentication when an important operation is being performed on the Web site, such as accessing a bank account or other sensitive data.

After a user has enrolled with a particular Web site that supports biometric authentication, subsequent visits to the same Web site cause the Web browser plug-in to detect that the user has already enrolled with the Web site. In this situation, the Web site prompts the user to perform user authentication (e.g., using the biometric device). In the case of a fingerprint sensor, the user swipes their finger across the fingerprint sensor or places their finger on the fingerprint sensor. If the fingerprint information matches a fingerprint template associated with the fingerprint sensor, the Web browser plug-in releases user secrets from the user credentials. In particular embodiments, the fingerprint sensor releases an OTP token or an RSA signature instead of plaintext credentials. After the credentials are released, they are communicated to the Web site to complete the user authentication process. In specific implementations, the server may generate a random challenge and communicate that challenge to the client device. The Web browser plug-in (or the biometric sensor) uses this challenge to construct a response based on the secure key and the random challenge. The response may be a hash of the secure key, a hash of the random challenge, or any other calculation. The server validates the user credentials and authenticates the user if the validation is successful.

In particular implementations, the user performs the enrollment process for each Web site the user accesses that supports biometric authentication. Additionally, different user credentials are associated with each Web site with which the user enrolls. Thus, if the user enrolls with five different Web sites that support biometric authentication, the biometric sensor in the user's computing device stores five separate sets of user credentials, each of which is associated with one of the five different Web sites. Additionally, if different users access the same Web site, separate user credentials and separate biometric templates are maintained for each user.

Particular embodiments of the Web browser plug-in support WBF (Windows Biometric Framework), thereby supporting any biometric device that supports the WBF interface. The Web browser plug-in also supports the Application Programming Interface specified by the BioAPI Consortium.

In alternate embodiments, the systems and methods determine that a Web site supports biometric authentication by providing a service or process that monitors Web site data and detects certain types of transactions on secure web sites. When a secure transaction is initiated, the systems and methods check the computing device accessing the Web site to determine if the computing device includes a fingerprint sensor or other biometric device. If so, an enrollment and/or authentication process is activated to offer an enhanced level of security to the user, as described herein.

Figure 8:
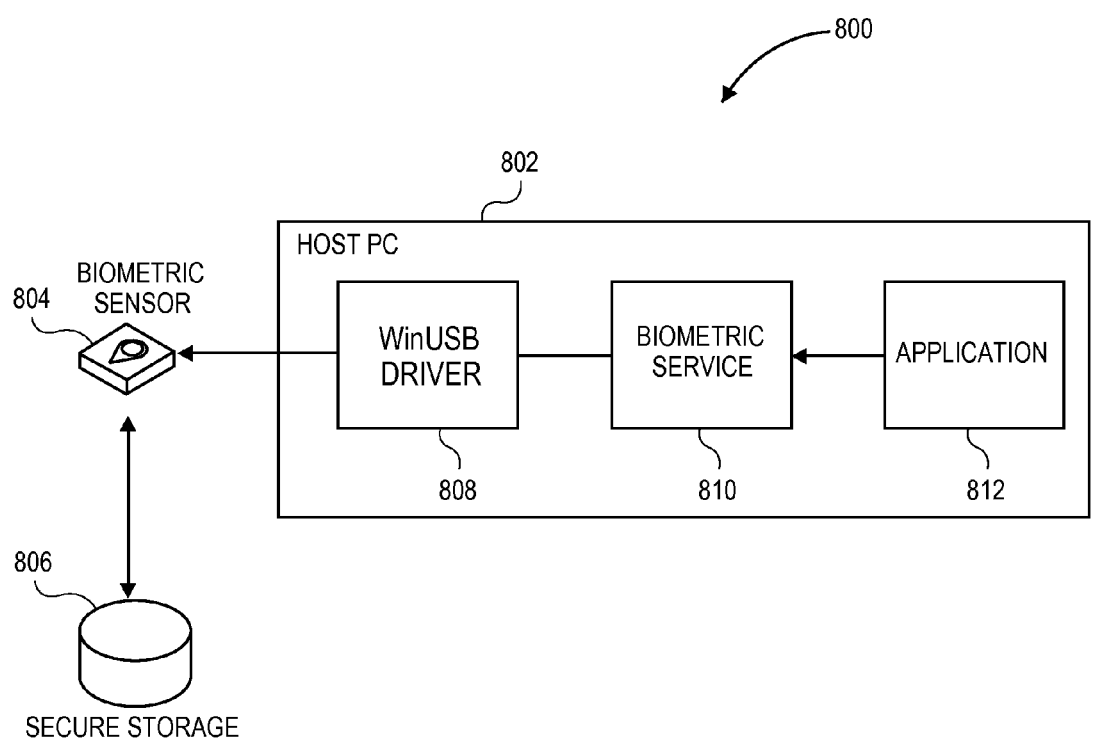
FIG. 8 depicts an example system capable of performing biometric user authentication.

FIG. 8 shows an example system 800 capable of performing biometric user enrollment and authentication via a biometric sensor 804 (such as a fingerprint sensor or other biometric device). In this example, a biometric service 810 executes on a host PC 802 and communicates with one or more applications 812 that may request user authentication. Example applications include Internet browser applications, financial applications, and the like. In a particular embodiment, the biometric service uses a Windows API (e.g., a WinUSB Driver) 808 to encrypt a fingerprint template database with system account credentials. In alternate embodiments, any type of API or similar interface may be used in place of Windows API 808. Biometric sensor 804 has a unique 128 bit encryption key and a unique identifier (e.g., serial number). The enrolled credentials of a user are encrypted with the encryption key and stored in a storage device, such as secure storage 806. In a particular embodiment, biometric service 810 is implemented as a service application running in a local system account.

In a particular embodiment, application 812 is an Internet browser application executing on host PC 802 and communicating with various web servers via the Internet. Application 812 includes a browser extension or browser plug-in that communicates with biometric service 810. In one implementation, biometric service 810 is a secure application executing in a background mode on host PC 802. Thus, biometric service 810 provides a communication interface to biometric sensor 804. The browser extension (or browser plug-in) associated with application 812 is capable of communicating transaction details, random challenges, signature information, user information, and other data to biometric service 810. Biometric service 810 also communicates with one or more web servers as part of the user enrollment and/or user authentication procedure.

Figure 9:
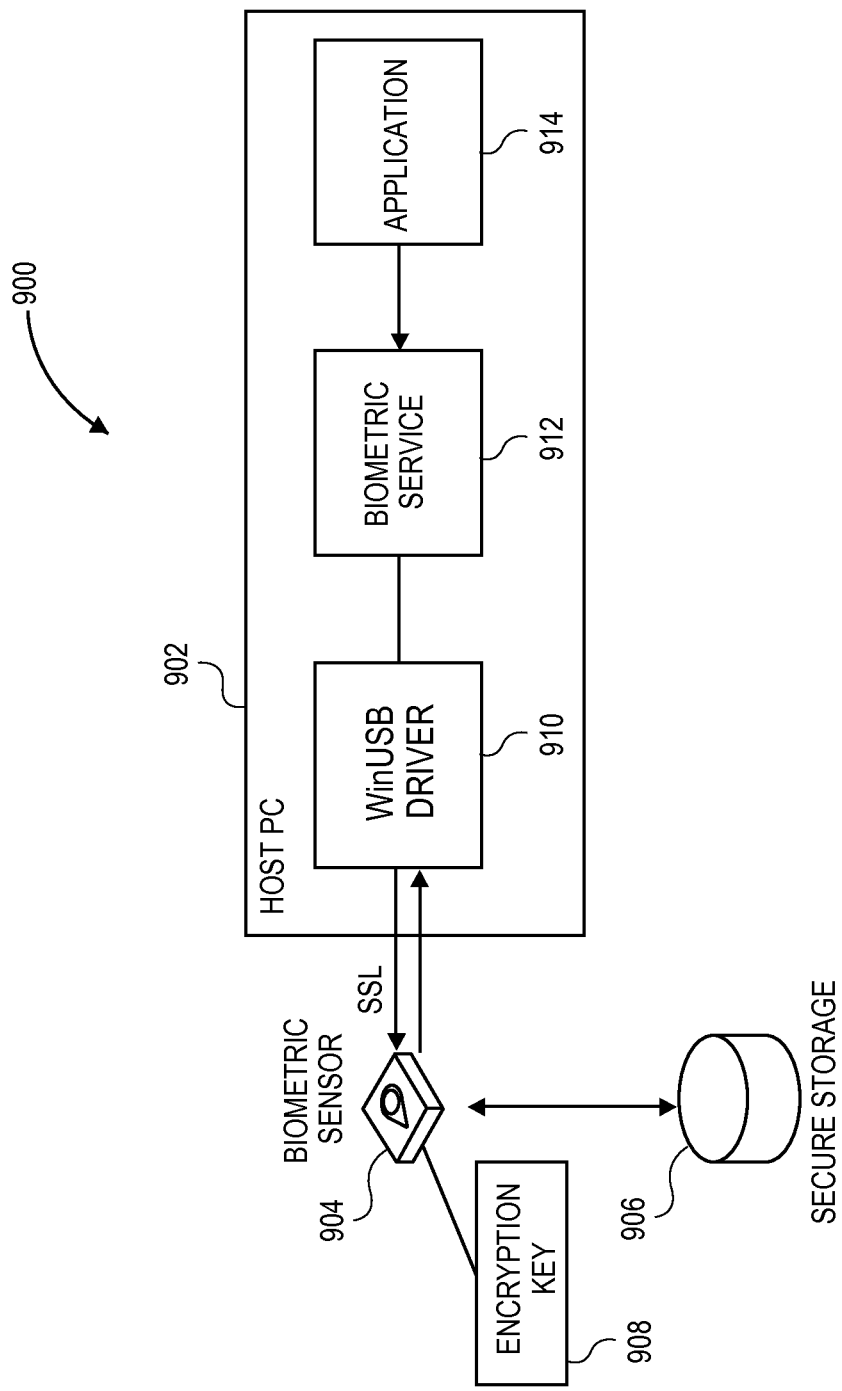
FIG. 9 depicts another example system capable of performing biometric user authentication.

FIG. 9 shows another example system 900 capable of performing biometric user enrollment and authentication via a biometric sensor 904. System 900 includes a host PC 902, a WinUSB driver 910, a biometric service 912 and an application 914 similar to the components discussed above with respect to FIG. 8. In the example of FIG. 9, the biometric sensor decrypts the user credentials only after a successful biometric reading, such as a fingerprint swipe or fingerprint scan (using a placement style fingerprint sensor). For example, in a successful fingerprint swipe, the swiped fingerprint information matches a fingerprint template associated with the fingerprint sensor. In a particular embodiment, the validity enterprise sensor has a unique 256 bit encryption key 908 and a unique identifier (e.g., serial number). The biometric sensor 904 creates a secure communication with Host PC 202 using SSL v3 protocol or other secure communication technique. In a particular implementation, biometric sensor 904 includes a "match on chip" functionality that releases a user's credentials only upon a successful fingerprint swipe or other biometric reading. User credentials and other information may be stored within biometric sensor 904, in a secure storage 906, or any other storage mechanism. In certain embodiments, the validity biometric service is implemented as a service application running in a local system account.

Figure 10:
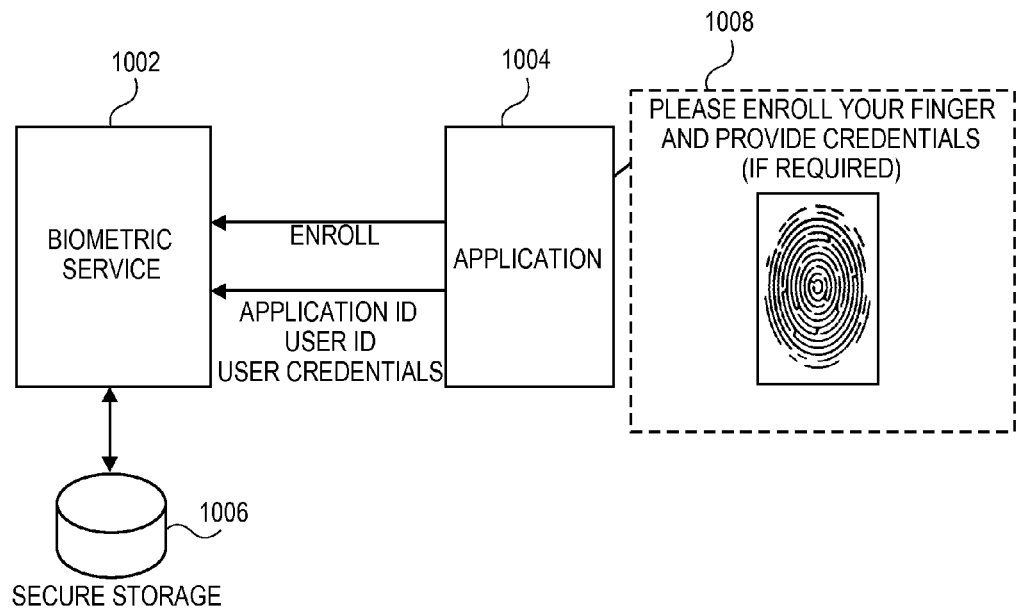
FIG. 10 depicts an example user enrollment process.

FIG. 10 shows an example user enrollment process in which the user enrolls using a fingerprint sensor to bind the user's fingerprint template with the user's credentials. An application 1004 that desires to enroll a user with a biometric device communicates with a biometric service 1002, which is coupled to a secure storage 1006. Biometric service 1002 is also coupled to a biometric sensor (not shown), which captures biometric data and communicates that data to the biometric service. Application 1004 initiates the user enrollment process by displaying a request 1008 for the user to provide their fingerprint (in the case of a fingerprint sensor) and provide user credentials. Application 1004 communicates a user enrollment request to biometric service 1002 as well as information regarding a user identifier (user id), an application identifier, and user credentials. The biometric service then captures the fingerprint data and stores the fingerprint data in secure storage 1006. Additional details regarding the user enrollment process are provided herein.

Figure 11:
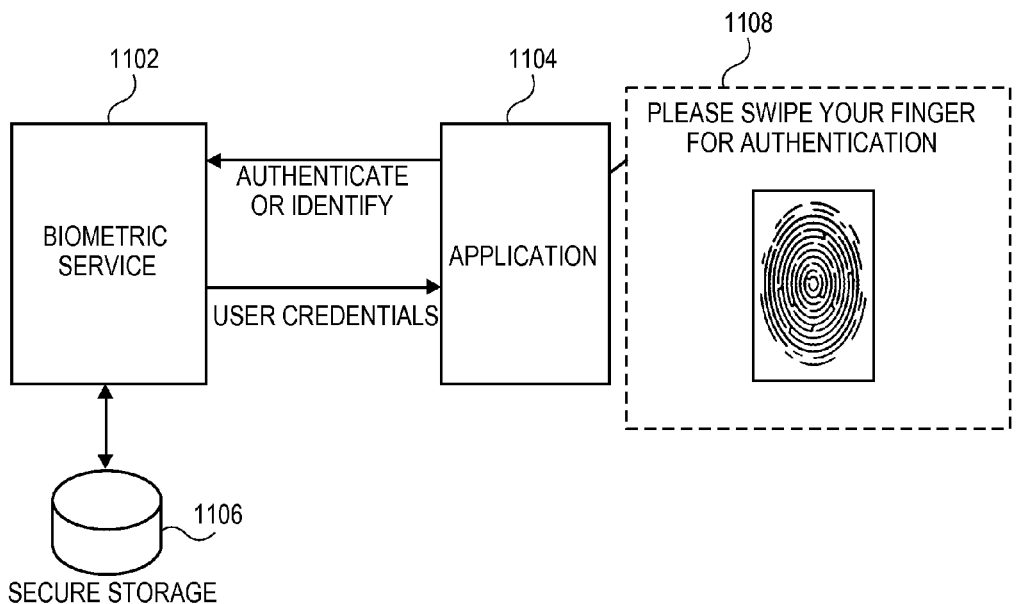
FIG. 11 depicts an example user authentication process.

FIG. 11 shows an example user authentication process using a fingerprint sensor. An application 1104 that desires to authenticate a user with a biometric device communicates with a biometric service 1102, which is coupled to a secure storage 1106. Biometric service 1102 is also coupled to a biometric sensor (not shown), which captures biometric data and communicates that data to the biometric service. Application 1104 initiates the user authentication process by displaying a request 1108 for the user to provide their fingerprint (in the case of a fingerprint sensor). Application 1104 communicates an authentication and/or identity request to biometric service 1102. The biometric service then captures the fingerprint data and identifies user credentials for the user associated with the fingerprint data. The user credentials are then communicated to application 1104. Additional details regarding the user authentication process are provided herein.

Figure 12:
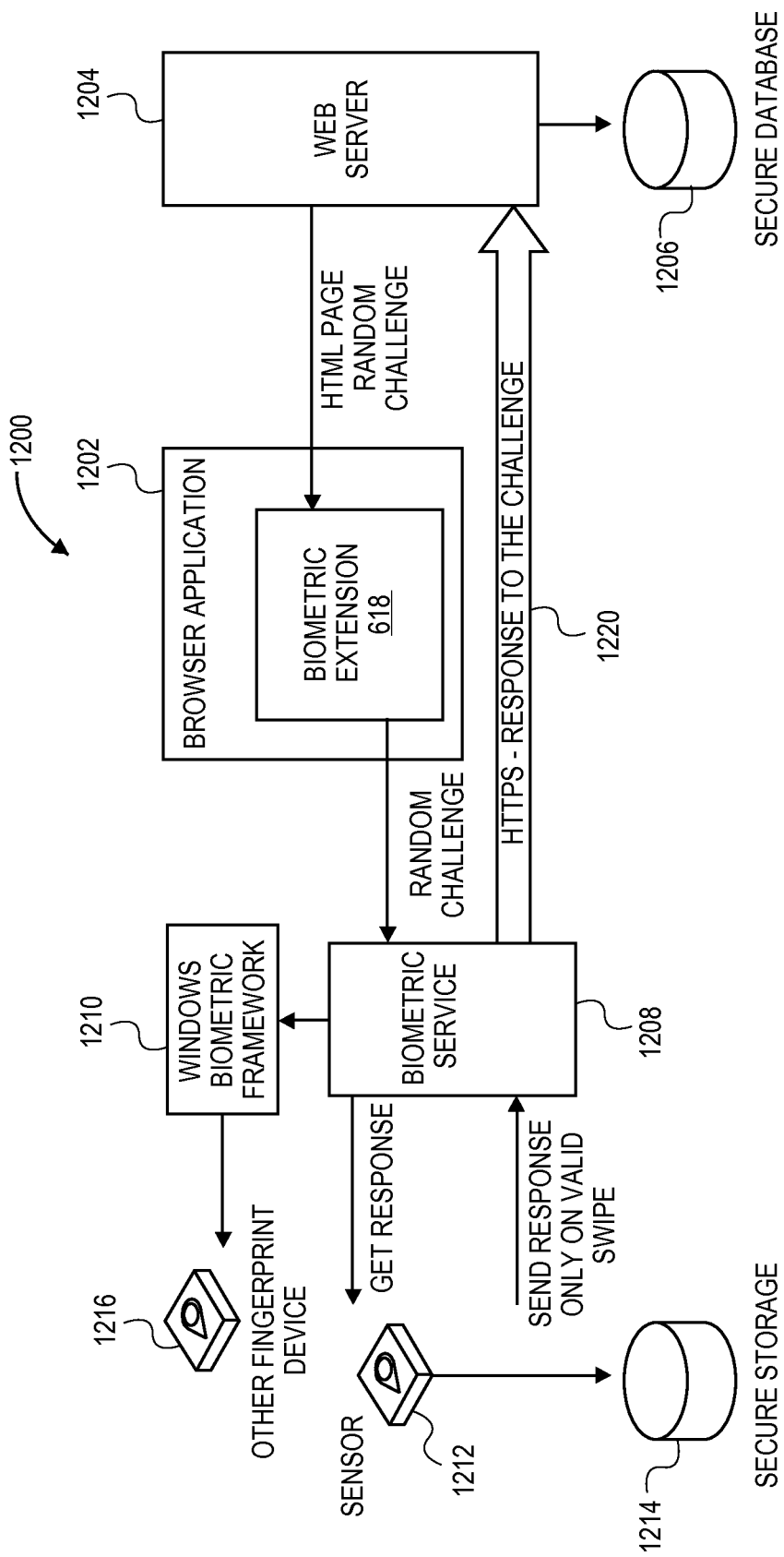
FIG. 12 depicts another example system capable of performing biometric user authentication.

FIG. 12 shows another example system 1200 capable of performing biometric user enrollment and authentication using any number of different types or brands of fingerprint sensors. Depending on the fingerprint sensor type and/or manufacturer, the system of FIG. 12 uses: 1) a WBF (Windows Biometric Framework) interface; 2) a biometric service; or 3) any other system or service to communicate data between an Internet browser application and the fingerprint sensor.

System 1200 includes a browser application 1202 capable of communicating with a web server 1204 and a biometric service 1208. Browser application 1202 includes a biometric extension 1218 that facilitates communication and handling of biometric-related data. In alternate embodiments, biometric extension 1218 is replaced with a browser application plug-in. Web server 1204 is coupled to a secure database 1206 that stores various data, such as data used during the biometric user enrollment and authentication procedures, as discussed herein.

Biometric service 1208 communicates with a Windows biometric framework 1210 and a fingerprint sensor 1212. Windows biometric framework 1210 also communicates with a fingerprint sensor 1216 that is not able to communicate directly with biometric service 1208. Thus, Windows biometric framework 1210 provides an interface between fingerprint sensor 1216 and biometric service 1208. Fingerprint sensor 1212 is capable of communicating directly with biometric service 1208 without needing Windows biometric framework 1210. Fingerprint sensor 1212 is coupled to a secure storage 1214 that stores user credentials, an encryption key, and related data.

During operation of system 1200, web server 1204 sends a web page (e.g., an HTML page) and a random challenge to browser application 1202. Biometric extension 1218 communicates the random challenge to biometric service 1208, which requests a response from fingerprint sensor 1212 (or requests a response from fingerprint sensor 1216 via Windows biometric framework 1210). Fingerprint sensor 1212 sends a response to biometric service 1208 after a valid fingerprint swipe (or scan). Thus, if a user fails to swipe a finger or fingerprint sensor 1212 reads invalid fingerprint information, no response is sent to biometric service 1208. In alternate embodiments, fingerprint sensor 1212 sends an "invalid fingerprint" message to biometric service 1208 if the fingerprint sensor reads invalid fingerprint information. If biometric service 1208 receives a positive response from fingerprint sensor 1212 (e.g., a valid fingerprint swipe), the biometric service communicates a response to the random challenge to web server 1204 using a secure communication link. Additional details regarding biometric user enrollment and authentication are provided below.

In a particular embodiment, a secret key (also referred to as a "secure key") is generated by a web server and stored by the web server. The secret key is also provided to the biometric sensor and/or the system containing the biometric sensor, and stored along with the biometric template associated with the user. The secret key can be a cryptographic key (DES, AES, etc.), a random seed, a random number, an RSA private key, and so forth. In alternate embodiments, the secret key is generated by a client device and communicated to the web server. The secure key may be transferred using HTTP or HTTPS and can be transferred directly to the browser application or directly to the browser application plug-in (or browser application extension). The biometric template is typically generated during enrollment of the user. Additionally, if the biometric device has a unique ID, that unique ID is sent to the web server for storage and use in future authentication procedures.

In particular embodiments, binary files used in the systems and methods discussed herein are signed and authenticated prior to running the binary files. This approach blocks malicious attempts to replace or edit the binary files. Additionally, applications communicating with the biometric service are validated at runtime.

Figure 13:
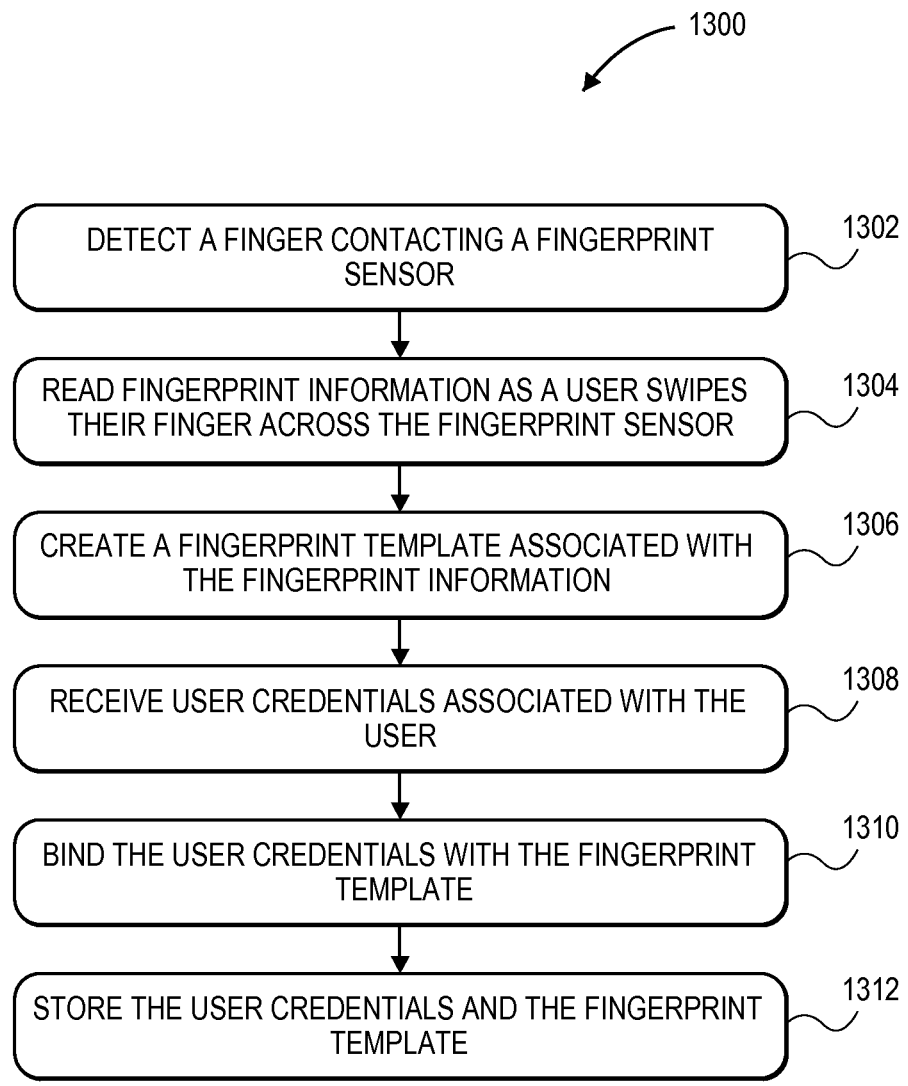
FIG. 13 is a flow diagram depicting an embodiment of a procedure for enrolling a user of a biometric authentication system.

FIG. 13 is a flow diagram depicting an embodiment of a procedure 1300 for enrolling a user of a biometric authentication system. Initially, procedure 1300 detects a finger contacting a fingerprint sensor or other biometric sensor (block 1302). Fingerprint information is read as the user swipes their finger across the fingerprint sensor (block 1304). In alternate embodiments using a placement fingerprint sensor, the fingerprint information is scanned as the user positions their finger on the sensor. The procedure continues by creating a fingerprint template associated with the fingerprint information (block 1306).

Procedure 1300 receives user credentials associated with the user (block 1308). Example user credentials include a password, a cryptographic key, a random seed or any other similar confidential information. Next, the procedure binds the user credentials with the fingerprint template (block 1310), then stores the user credentials and the fingerprint template (block 1312) in a secure storage device.

In a specific embodiment, the procedure also binds a particular web site (e.g., a web site requesting biometric enrollment and/or biometric authentication of a user) with the fingerprint template. Thus, a particular user may perform the biometric enrollment procedure for each web site that the user is to provide future biometric authorization or biometric authentication.

Figure 14:
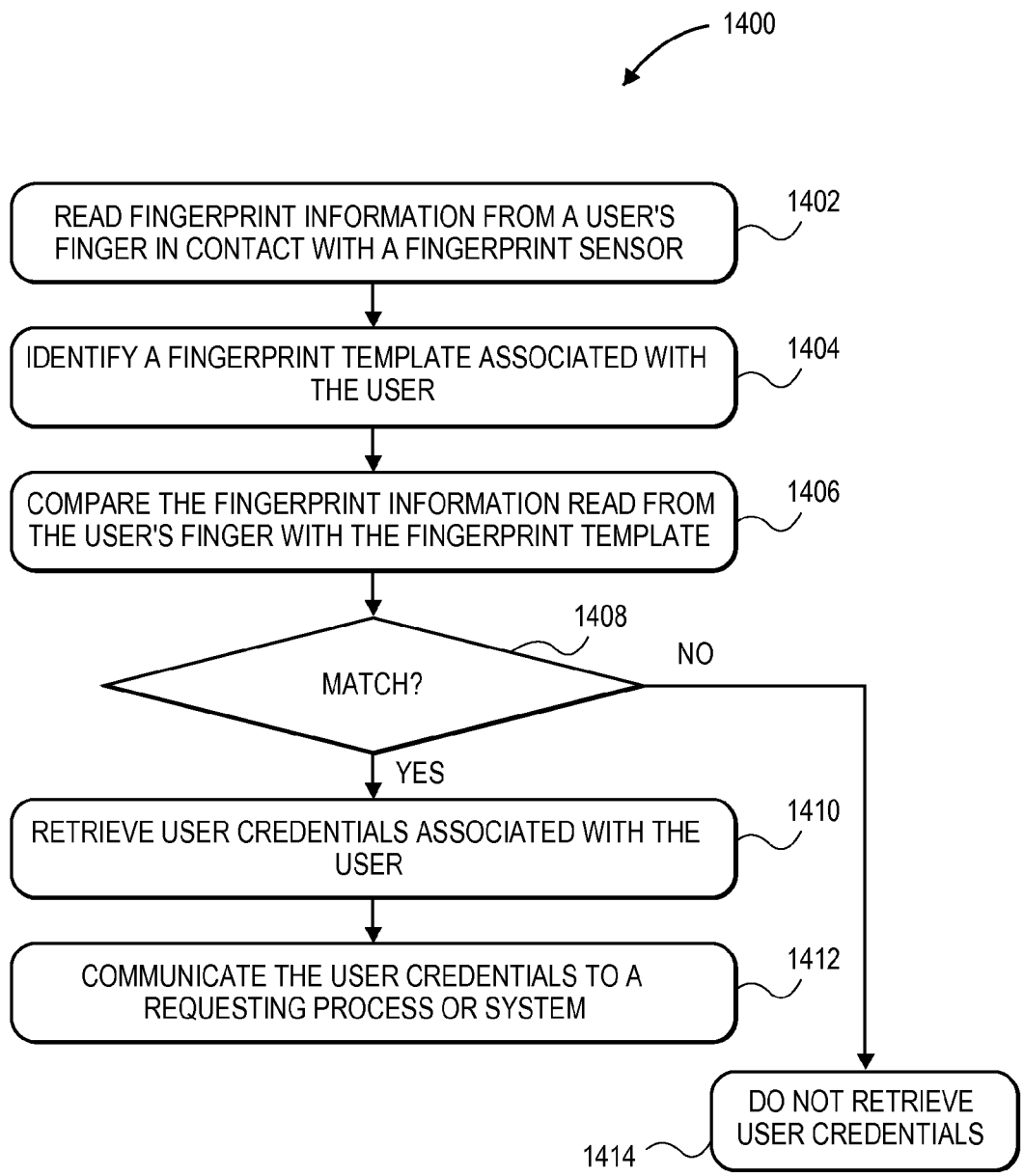
FIG. 14 is a flow diagram depicting an embodiment of a procedure for authenticating a user of a biometric authentication system.

FIG. 14 is a flow diagram depicting an embodiment of a procedure 1400 for authenticating a user of a biometric authentication system. Procedure 1400 is performed after a particular user has enrolled with the biometric authentication system using, for example, the procedure discussed with respect to FIG. 13. The authentication procedure reads fingerprint information from a user's finger in contact with a fingerprint sensor (block 1402). Procedure 1400 then identifies a fingerprint template associate with the user (block 1404) who is accessing the fingerprint sensor. The fingerprint information read from the user's finger is compared with the fingerprint template (block 1406) to determine whether there is a match (block 1408). If the fingerprint information read by the fingerprint sensor does not match the information stored in the fingerprint template, the biometric authentication system does not retrieve the user credentials (block 1414). Thus, the user credentials remain securely stored if a match is not detected.

If the fingerprint information read by the fingerprint sensor matches the information stored in the fingerprint template, the biometric authentication system retrieves the credentials associated with the user (block 1410). The user credentials are then communicated to a requesting process or system (block 1412).

Figure 15:
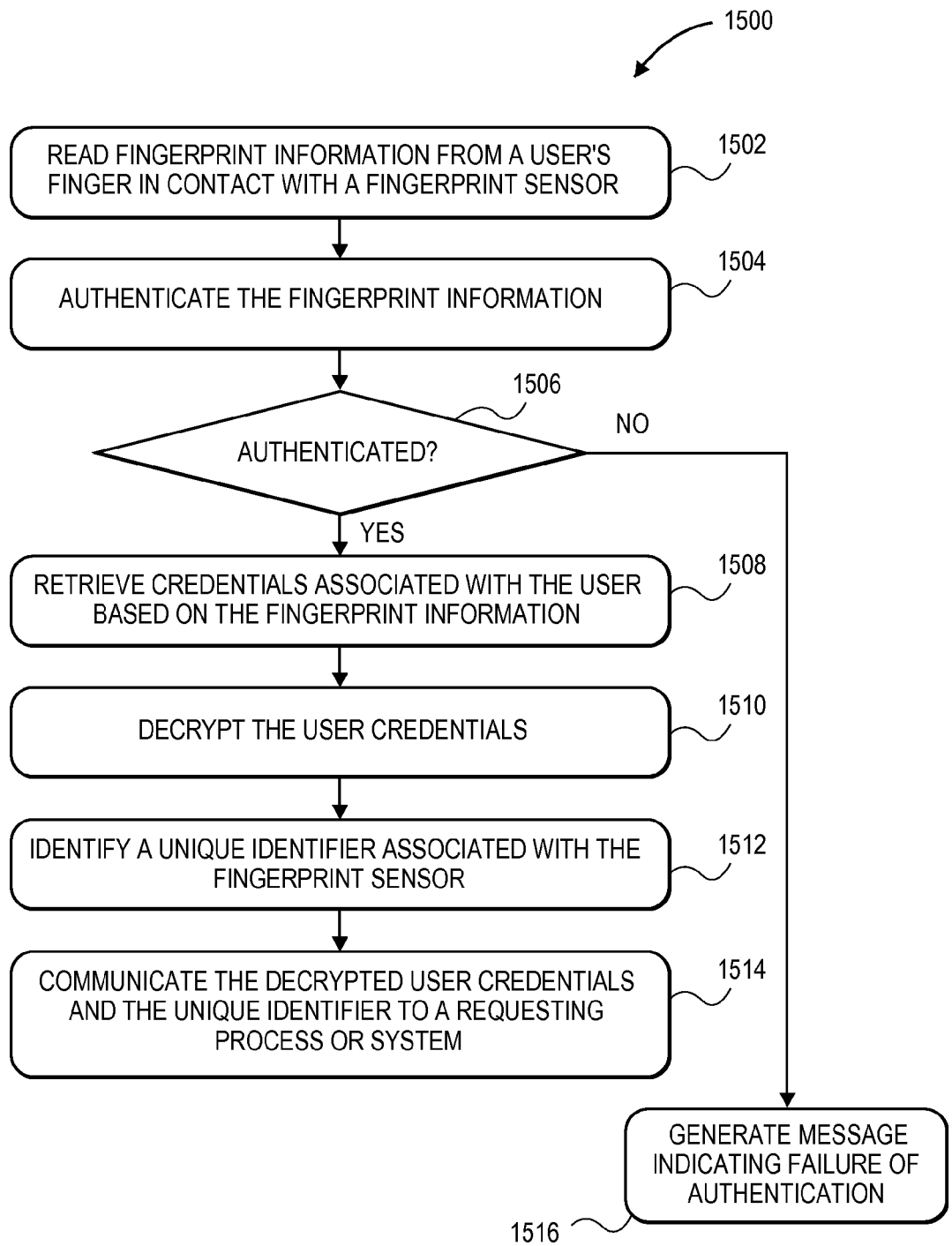
FIG. 15 is a flow diagram depicting another embodiment of a procedure for authenticating a user of a biometric authentication system.

FIG. 15 is a flow diagram depicting another embodiment of a procedure 1500 for authenticating a user of a biometric authentication system. Initially, procedure 1500 reads fingerprint information from a user's finger in contact with a fingerprint sensor (1502). The procedure then authenticates the fingerprint information (block 1504). If the fingerprint information is not authenticated, a message is generated indicating an authentication failure (block 1506). If the fingerprint information is authenticated, the procedure retrieves credentials associated with the user based on the fingerprint information (block 1508). The procedure then decrypts the user credentials (block 1510) and identifies a unique identifier associated with the fingerprint sensor (block 1512). The decrypted credentials and the unique identifier are communicated to a requesting process or system (block 1514).

Figure 16:
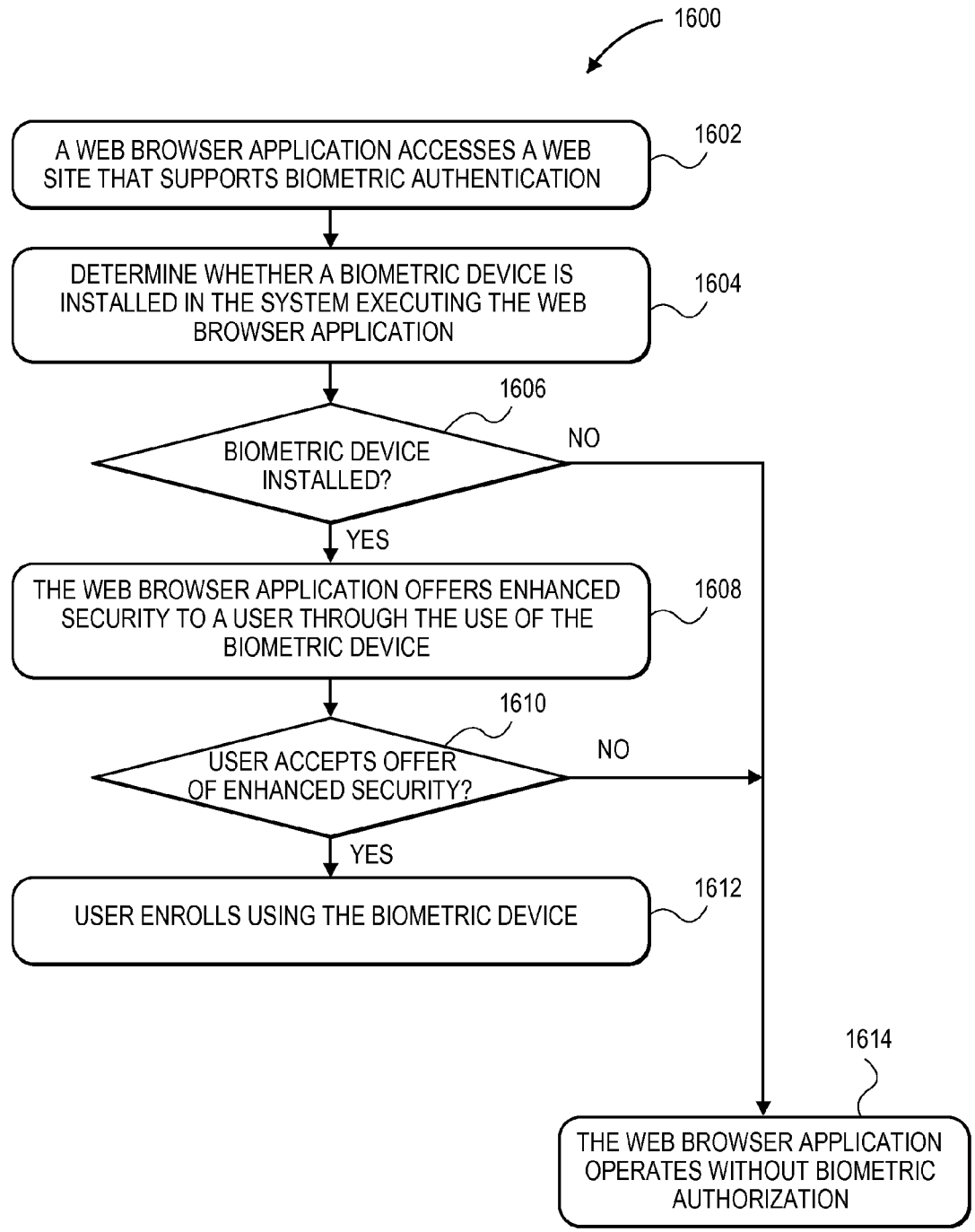
FIG. 16 is a flow diagram depicting an embodiment of a procedure for authenticating a user of a Web browser application that supports biometric authentication.

FIG. 16 is a flow diagram depicting an embodiment of a procedure 1600 for authenticating a user of a Web browser application that supports biometric authentication. Initially, a web browser application accesses a web site that supports biometric authentication (block 1602). The procedure then determines whether a biometric device is installed in the system executing the web browser application (block 1604). The biometric device may be physically installed in the system or coupled to the system, such as via a universal serial bus (USB) or other communication link. If a biometric device is not installed (block 1606), the web browser application operates without biometric authentication (block 1614).

If a biometric device is installed in the system executing the web browser application, the web browser application offers enhanced security to a user through the use of the biometric device (block 1608). If the user accepts the offer of enhanced security at block 1610, the user enrolls using the biometric device (block 1612). The user enrolls, for example, using the enrollment procedure discussed herein. If the user does not accept the offer of enhanced security at block 1610, the web browser application operates without biometric authentication (block 1614).

Figure 17:
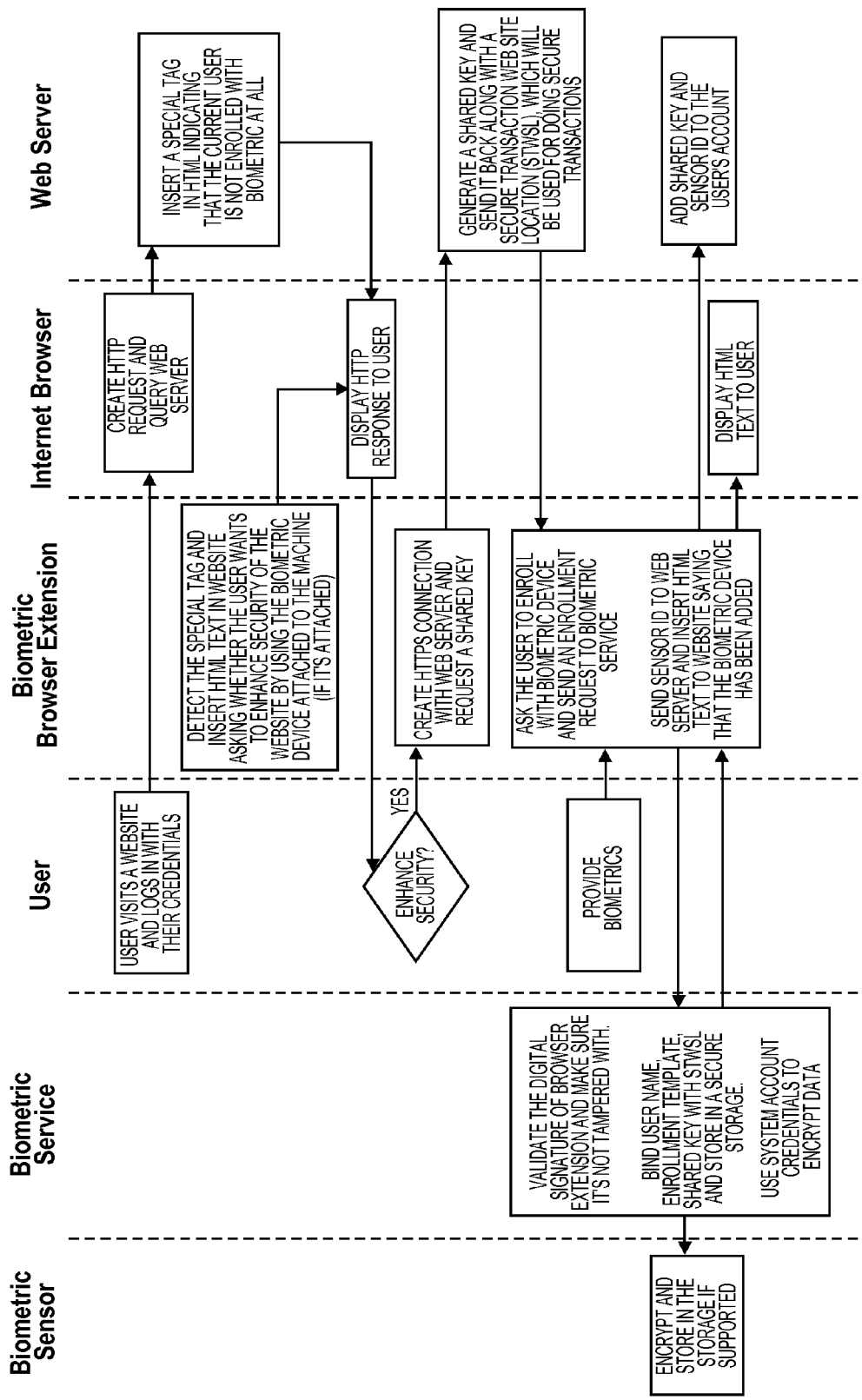
FIG. 17 depicts another embodiment of a procedure for enrolling a user of a biometric authentication system.

FIG. 17 depicts another embodiment of a procedure for enrolling a user of a biometric authentication system. FIG. 17 shows the various actions and functions performed during the enrollment of a user and the component or system that performs those actions or functions.

Figure 18:
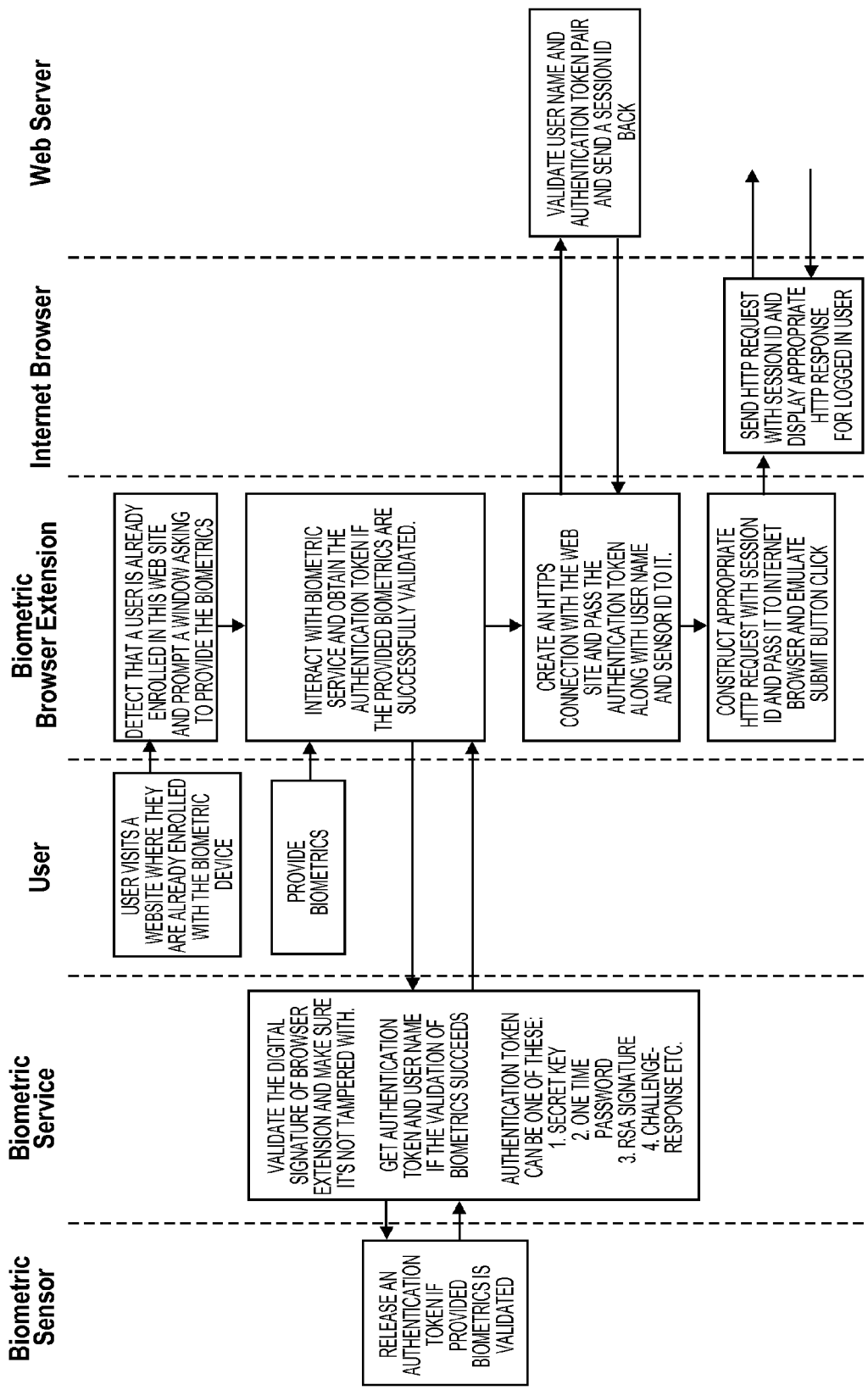
FIG. 18 depicts another embodiment of a procedure for identifying and authenticating a user of a biometric authentication system.

FIG. 18 depicts another embodiment of a procedure for identifying and authenticating a user of a biometric authentication system. FIG. 18 shows the various actions and functions performed during the identification and authentication of a user and the component or system that performs those actions or functions.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate enrollment and authentication of users through a biometric device, such as a fingerprint sensor. Certain embodiments described herein facilitate one or more secure transactions. Additionally, some embodiments are used in conjunction with one or more conventional fingerprint sensing systems and methods. For example, one embodiment is used as an improvement of existing fingerprint detection and/or sensing systems.

Although the components and modules illustrated herein are shown and described in a particular arrangement, the arrangement of components and modules may be altered to enroll and authenticate users in a different manner, or to implement secure transactions in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method of implementing a secure transaction, the method comprising:
receiving, through a web browser application executing on a user computing device, from the user computing device, a request from a user for authentication of a transaction to be executed securely by a web server implementing secure transactions;
transmitting through a web browser plug-in executing on the user computing device transaction information to the user computing device, the transaction information comprising transaction details corresponding to the request received from the user by the web server, an HTML tag uniquely identifying the web server and a signature of the web server, wherein the transmitting of the transaction information including the transaction details, the HTML tag and the signature of the web server, to the user computing device, identifying the web server implementing secure transactions to the user computing device;
receiving from the user computing device, an indication that there has been an authentication of the user obtained utilizing a biometric device associated with the user computing device,
wherein the authentication of the user is performed by the web server upon receiving valid biometric information from the user through the web browser plug-in,
wherein the user submits the valid biometric information to the server via the web browser plug-in after verifying, using the web browser plug-in, the transaction details presented to the user in a transaction window generated by a biometric service, executing on the user computing device, and
wherein the web server monitors the transaction details presented to the user in the transaction window ensuring that the presented transaction details are not modified by a malicious entity, by verifying the integrity of the data in the transaction window through the biometric service at regular or at random time intervals concurrently to the user verification of the presented transaction details in the transaction window and upon detection of a modification of the transaction details the biometric service instructs the web server to cancel the transaction.

2. The method of claim 1, wherein the biometric information includes fingerprint characteristics associated with the user's finger.

3. The method of claim 1, wherein the biometric information is obtained by imaging user fingerprint characteristics using a fingerprint sensor.

4. The method of claim 1, further comprising displaying transaction details to the user via the web browser plug-in.

5. A computer comprising:
a processor; and
a memory coupled to the processor, the memory comprising computer-executable instructions that when executed by the processor perform operations including:
receiving from a web server implementing secure transactions a request for authentication of a transaction to be executed securely by the web server, the request causing a web browser plug-in executing on a user computing device to return transaction information to the user computing device, the transaction information comprising transaction details corresponding to a transaction request received from the user computing device by the web server, an HTML tag uniquely identifying the web server and a signature of the web server, wherein the return of the transaction information back to the user computing device, the HTML tag and the signature of the web server identifying the web server implementing secure transactions to the user computing device; and
receiving from the user computing device, an indication that there has been an authentication of the user obtained utilizing a biometric device associated with the user computing device, wherein the authentication of the user is performed by the web server upon receiving valid biometric information from the user through the web browser plug-in, wherein the user submits the valid biometric information to the server via the web browser plug-in after verifying, using the web browser plug-in, the transaction details presented to the user in a transaction window generated by a biometric service, executing on the user computing device, and wherein the web server monitors the transaction details presented to the user in the transaction window ensuring that the presented transaction details are not modified by a malicious entity, by verifying the integrity of the data in the transaction window through the biometric service at regular or at random time intervals concurrently to the user verification of the presented transaction details in the transaction window and upon detection of a modification of the transaction details the biometric service instructs the web server to cancel the transaction.

6. The computer of claim 5, wherein the biometric information includes fingerprint characteristics associated with a finger of the user.

7. The computer of claim 5, wherein receiving biometric information from the user includes imaging user fingerprint characteristics using a fingerprint sensor.

8. A non-transitory machine readable media storing thereon instructions that, when executed by a computing device, cause the computing device to perform a method comprising:

receiving at a web server implementing secure transactions from a web browser application executing on a user computing device, a user transaction request for execution of a transaction to be executed by the web server;

transmitting through a web browser application executing on the user computing device, transaction information to the user computing device comprising transaction details corresponding to a transaction request received from the user computing device by the web server, an HTML tag uniquely identifying the web server and a signature of the web server, wherein the transmitting of the transaction information to the user computing device identifying the web server implementing secure transactions to the user computing device;

receiving from the user computing device, an indication that there has been an authentication of the user obtained utilizing a biometric device associated with the user computing device, wherein the authentication of the user is performed by the web server upon receiving valid biometric information from the user through the web browser plug-in, wherein the user submits the valid biometric information to the server via the web browser plug-in after verifying, using the web browser plug-in, the transaction details presented to the user in a transaction window generated by a biometric service, executing on the user computing device, and wherein the web server monitors the transaction details presented to the user in the transaction window ensuring that the presented transaction details are not modified by a malicious entity, by verifying the integrity of the data in the transaction window through the biometric service at regular or at random time intervals concurrently to the user verification of the presented transaction details in the transaction window and upon detection of a modification of the transaction details the biometric service instructs the web server to cancel the transaction.

9. A system comprising:

a computing device configured to:

receive through a web browser application executing on a user computing device, from the user computing device a request for authentication of a transaction to be executed by the web server implementing secure transactions;

transmitting through a web browser plug-in executing on the user computing device transaction information to the user computing device, the transaction information comprising transaction details corresponding to the request received from the user computing device by the web server, an HTML tag uniquely identifying the web server and a signature of the web server, wherein the transmitting of the transaction information including the transaction details, the HTML tag and the signature of the web server, to the user computing device, identifying the web server implementing secure transactions to the user computing device;

receiving from the user computing device, an indication that there has been an authentication of the user obtained utilizing a biometric device associated with the user computing device, wherein the authentication of the user is performed by the web server upon receiving valid biometric information from the user through the web browser plug-in, wherein the user submits the valid biometric information to the server via the web browser plug-in after verifying, using the web browser plug-in, the transaction details presented to the user in a transaction window generated by a biometric service, executing on the user computing device, and wherein the web server monitors the transaction details presented to the user in the transaction window ensuring that the presented transaction details are not modified by a malicious entity, by verifying the integrity of the data in the transaction window through the biometric service at regular or at random time intervals concurrently to the user verification of the presented transaction details in the transaction window and upon detection of a modification of the transaction details the biometric service instructs the web server to cancel the transaction.

\* \* \* \* \*